US008165891B2

(12) United States Patent
Roberts

(10) Patent No.: US 8,165,891 B2
(45) Date of Patent: *Apr. 24, 2012

(54) GREEN RATING SYSTEM AND ASSOCIATED MARKETING METHODS

(76) Inventor: Charles E. S. Roberts, London (GB)

( * ) Notice: Subject to any disclaimer, the term of this patent is extended or adjusted under 35 U.S.C. 154(b) by 649 days.

This patent is subject to a terminal disclaimer.

(21) Appl. No.: 12/211,548

(22) Filed: Sep. 16, 2008

(65) Prior Publication Data

US 2009/0171722 A1    Jul. 2, 2009

Related U.S. Application Data

(63) Continuation-in-part of application No. 11/967,964, filed on Dec. 31, 2007.

(51) Int. Cl.
*G06Q 10/00* (2012.01)
(52) U.S. Cl. ........................................ 705/1.1
(58) Field of Classification Search ........................ None
See application file for complete search history.

(56) References Cited

U.S. PATENT DOCUMENTS

| | | | |
|---|---|---|---|
| 6,490,565 B1 * | 12/2002 | Beldock ........................ | 705/7.38 |
| 7,092,898 B1 * | 8/2006 | Mattick et al. ............... | 705/14.41 |
| 7,197,397 B2 * | 3/2007 | Matsuda et al. ................. | 702/2 |
| 2004/0093098 A1 * | 5/2004 | Ohki et al. ....................... | 700/90 |
| 2005/0021389 A1 * | 1/2005 | Dias et al. ........................ | 705/10 |
| 2005/0203866 A1 | 9/2005 | Daud et al. | |
| 2005/0209905 A2 * | 9/2005 | Ness et al. ....................... | 705/10 |
| 2006/0020502 A1 * | 1/2006 | Trout et al. ........................ | 705/9 |
| 2006/0100897 A1 * | 5/2006 | Halloran et al. .................. | 705/1 |
| 2006/0129450 A1 * | 6/2006 | Zarrow ........................... | 705/11 |
| 2006/0265230 A1 * | 11/2006 | Shiga ................................ | 705/1 |
| 2006/0286518 A1 | 12/2006 | Yoder | |
| 2008/0160147 A1 * | 7/2008 | Tormey ........................ | 426/383 |
| 2009/0106317 A1 * | 4/2009 | Letendre-Hedlund ..... | 707/104.1 |
| 2009/0119023 A1 * | 5/2009 | Zimmer et al. .................. | 702/22 |

FOREIGN PATENT DOCUMENTS

| WO | WO02019230 | | 7/2002 |
|---|---|---|---|
| WO | WO2006107314 | A1 | 10/2006 |

* cited by examiner

*Primary Examiner* — Jonathan Ouellette

(57) ABSTRACT

A method and system for assigning a rating to an entity based on a plurality of metrics, for example, assigning a rating to an entity which reflects that entity's level of environmental performance, and then assigning an indicia to the entity which reflects the rating relative to other like entities. The system includes ways to generate revenue based on the entity's use of the indicia, such as integrating the display of the indicia with search engines such that the indicia is displayed when the entity's link appears on a search results list and charging a per impression and/or a per click through microfee. The invention also comprises a filtered search facility which only features rated member entities on its search results list. A website is also provided which contains landing pages for each rated entity which may be accessed by clicking on the displayed indicia in the search results list.

84 Claims, 21 Drawing Sheets

Web    Images    Video    Local    News    Product    Green    More

Search Co

[airline flights]    Search

Compare Prices on cheap flights - low cost flights - buy flight tickets
www.compareallflights.com News results for airline flights

| NEWS  | Airline flights are suspended in strike row
| IMAGE | Hundreds of passengers delayed in walkout over...
|       | Airline flights delayed following hijak attempt Green Star climate leader ratings results for airline flights:
Transatlantic carriers:
| BEST-IN- | Virgin Atlantic    ☆☆☆
| CLASS    | United             ☆☆☆
| FOR      | Air France         ☆
| CLIMATE  |

| BEST-IN- | US Domestic
| CLASS    | Jet Blue           ☆☆
| FOR      | Virgin America     ☆☆
| CLIMATE  | More...

Image results for airline flights...

SPONSORED LINKS

Flights from $10
www.cheapestflightsonline.com

Guaranteed greenest airline carriers
www.onlygreenratedflights.com
We only book airlines holding stars...

Virgin: only airline with 3 years of 3 stars!  ☆☆☆
www.virginatlanticgreenerflights.com
Our certified Green Star rating: ☆☆☆

*FIGURE 8*

INPUTS 1701

| Example RAW DATA and resultant INTENSITY MEASURES for Sector of X: | | | | | | | | | |
|---|---|---|---|---|---|---|---|---|---|
| Entity | Net Emissions (tCO2e) | Sales ($) | Per-Sale Intensity (tCO2e/$) | Employee Number (# fte) | Per-empl Intensity (tCO2e/fte) | Space Measure (sq m) | Per-Space Intensity (tCO2e/sqm) | Output Units (widgets) | Per output Intensity (tCO2e/widget) |
| U | 4,000 | 9,000 | 0.444 | 1050 | 3.80 | 100,000 | 0.040 | 360,000 | 0.0111 |
| V | 20,000 | 50,000 | 0.400 | 4000 | 5.00 | 450,000 | 0.040 | 2,500,000 | 0.008 |
| W | 50,000 | 100,000 | 0.500 | 8333 | 6.00 | 1000,000 | 0.050 | 3,333,333 | 0.015 |
| ▶X | 10,000 | 22,222 | 0.450 | 2250 | 4.44 | 300,000 | 0.033 | 1,000,000 | 0.010 |
| Y | 400,000 | 1,200,000 | 0.333 | 100000 | 4.00 | 16,000,000 | 0.025 | 44,000,000 | 0.009 ◀ |
| Z | 5,000 | 8,000 | 0.625 | 800 | 6.25 | 100,000 | 0.050 | 400,000 | 0.013 |

_Disorganised Data_
_Interim Data_ 1702

| 'INTERIM DATASET': ordered INTENSITY MEASURE Columns for Sector: | | | | | | | | |
|---|---|---|---|---|---|---|---|---|
| Entity | Per-Sale Intensity | Entity | Per-empl Intensity | Entity | Per-Space Intensity | Entity | Per-unit Intensity | NB: Equation for 'Analogue Rank', R |
| Y | 0.333 | U | 3.80 | Y | 0.025 | V | 0.008 | one R value per intensity, |
| V | 0.400 | Y | 4.00 | X | 0.033 | Y | 0.009 | R = the absolute position |
| U | 0.444 | X | 4.44 | U | 0.040 | X | 0.010 | on the spread of sector |
| X | 0.450 | V | 5.00 | V | 0.044 | U | 0.010 | => |
| W | 0.500 | W | 6.00 | W | 0.050 | Z | 0.013 | R = 1 + (X-leader)(n-1) |
| Z | 0.625 | Z | 6.25 | Z | 0.050 | W | 0.015 | (laggard-leader) |

| 'META DATASET': ordered ANALOGUE RANK VALUE Columns for Sector: | | | | | | | | |
|---|---|---|---|---|---|---|---|---|
| Per-Sales Intensity | | Per-Employee Intensity | | Per-Space Intensity | | Per-Output Intensity | | '100 such columns' make weighted averages |
| ENTITY | 'R' | ENTITY | 'R' | ENTITY | 'R' | ENTITY | 'R' | (> CARRY TO MOD 7) |
| Y | 1.000 | U | 1.000 | Y | 1.000 | V | 1.000 | where # columns = |
| V | 2.147 | Y | 1.408 | X | 2.600 | Y | 1.714 | % weighting applied. Eg: |
| U | 2.901 | X | 2.306 | U | 4.000 | X | 2.429 | 50 columns Sales ie 50% |
| X | 3.003 | V | 3.450 | V | 4.800 | U | 3.143 | 10 columns FTE ie 10% |
| W | 3.860 | W | 5.490 | W | 6.000 | Z | 4.571 | 20 columns Sq M ie 20% |
| Z | 6.000 | Z | 6.000 | Z | 6.000 | W | 6.000 | 30 columns Output, 30% |

_Organised Meta Data_ 1703

OUTPUT

FIGURE 17

GREEN RATING SYSTEM AND ASSOCIATED MARKETING METHODS

RELATED APPLICATIONS

This application is a continuation-in-part of U.S. patent application Ser. No. 11/967,964, filed Dec. 31, 2007, entitled "Green Rating System and Associated Marketing Methods".

FIELD OF THE INVENTION

The present invention relates to the field of marketing, and, in particular, to a method of marketing utilizing a green rating system to market companies based on their degree of environmental responsibility, using both the internet and non computer-based methods.

BACKGROUND OF THE INVENTION

Recent concerns regarding global climate change have given rise to the concept that an entity, whether an individual, corporation or government, can be "green" with respect to certain behaviors which may involve an environmental impact.

The green movement is premised on two assumptions. First, that global climate change is occurring and that it is causing the climate of the Earth to warm, and, second, that human activity, in particular industrial activity, is a factor in the change, as opposed to any such changes occurring naturally as the result of natural global climate cycles.

This is based on the theory that the levels of various greenhouse gases (GHG) in the atmosphere, in particular the six identified by the Kyoto Protocol—carbon dioxide ($CO_2$), methane ($CH_4$), Nitrous Oxide ($N_2O$), hydrofluorocarbons (HFCs), perfluorocarbons (PFCs), and sulphur hexafluoride ($SF_6$)—have been increasing as the result of human activity, and that this increase is causing, or at least contributing to, a general warming trend in the Earth's climate in a manner well understood by those of skill in the art.

The net greenhouse gas emission of an entity is often measured in equivalent units of $CO_2$ and referred to as an entity's "carbon footprint". An entity's carbon footprint is believed to be a representative measure of that entity's impact on the environment vis-á-vis the concentration of GHG in the atmosphere. Entities that undertake initiatives to reduce their carbon footprint are often deemed to be socially responsible, and are therefore often labeled as being "green" or environmentally friendly. As used herein, the term $CO_2$ implies and is meant to include all types of GHG emissions.

There are a number of basic components to consider in making a determination of, or in attempting to measure an entity's carbon footprint. Of primary concern are operational effects, in which emissions arising from the activities undertaken by the entity itself (and other emitting entities it has ownership or control of) are considered. There are also upstream and downstream effects which may also be taken into account in determining an entity's net emissions.

For the purposes of accurate 'carbon accounting', the operational activities of the entity may be further subdivided into direct GHG emissions and indirect GHG emissions.

Direct operational emissions are defined as having occurred from sources that are owned or controlled by the entity, including, for example, emissions from combustion in owned boilers or vehicles. For the purposes of compiling emissions data reports for carbon auditing and regulatory submission, an entity's direct emissions are often collectively referred to as Scope 1 emissions by those of skill in the art. These emissions can be measured accurately utilizing equations which may require, for example, knowledge of mass/volume of fuel burned per unit time and knowledge of how the fuel was burned.

An entity's Scope 1 emissions can be affected by many factors, including such things as the manner in which factories are operated or goods are transported within and by the company. For example, a company using hybrid vehicles to transport its goods rather than traditional internal-combustion-only vehicles may be deemed to have reduced its carbon footprint by a certain degree. Likewise, companies who have undertaken efforts to reduce their factory emissions, for example by using on-site renewable heat sources such as solar thermal paneling, will also have a smaller carbon footprint than companies that have not engaged in such efforts.

Indirect operational emissions are defined as having resulted from the generation of the electricity consumed by the entity. These emissions occur physically at the facility where electricity is generated by the entity's supplier and are often collectively referred to as Scope 2 emissions by those of skill in the art. These emissions also can be calculated with a high degree of accuracy using knowledge of the amount of electricity used in a particular time period (for instance in Megawatt-Hours), and then using the 'emissions factor' relating to a particular power supplier and specified tariff.

These Scope 2 emissions will be decreased proportionally if the entity chooses an electricity supply tariff that includes a component of renewable energy. Likewise, emissions may be reduced if the entity is able to reduce its need to import electricity from an outside supplier by such methods as improving energy efficiency, or developing on-site renewable power sources such as solar photovoltaic panels.

A range of other emissions relating to an entity's activities may also be considered in calculating its net carbon footprint. These will vary by industry sector and sub-sector and are often referred to as Scope 3 emissions. They may include emissions resulting from such activities as employee travel, and travel to the entity's premises of downstream consumers. Both upstream and downstream suppliers of the entity's value chain may be considered in estimating Scope 3 emissions. This may be important, for instance because the 'carbon-intense' parts of the value chain might be performed by a third party rather than by the entity under consideration, but still arise as a result of the entity's business. An example of the latter would be an online mail-order firm which, having a small warehouse and office, might cause low direct/indirect emissions itself, but subcontracts a delivery firm with a fleet of trucks and high emissions. The downstream effects factor may also be affected by a plethora of other factors which are likely to vary from industry to industry.

An additional downstream emissions source which may be factored into an assessment of the green-ness of a particular company is consideration of how efficiently a company's products operate. This would include manufacturers of products which consume electricity (causing indirect emissions), for instance televisions, or burn fuel (causing direct emissions), for instance automobiles. Because the products would not be owned or operated by the company during their use and resulting emissions, these would be considered Scope 3 downstream emissions.

Likewise, the emissions resulting from upstream suppliers to a particular entity's business activity may need to be taken into account for calculation of net carbon footprint. For example, suppliers of raw materials and other resources to an entity may be considered green or less green, depending upon how they conduct their affairs. Entities wishing to reduce their own net carbon footprint may therefore choose to do business with like-minded entities, for example, choosing a supplier that uses low-emission vehicles or relies on renewable energy to power their facilities.

Naturally, there are costs associated with being green. Raw materials from upstream green suppliers may be more costly than obtaining the same resources from a less-green company. Costs of renovating factories to be more environmentally friendly can be significant Therefore, there may be varying degrees of "green-ness", depending upon how much of an investment a company is willing or able to make and how much its carbon footprint can be reduced.

There may also be advantages to making a company's operations as green as possible. More and more companies are becoming environmentally friendly because their customers and investors demand it, preferring to do business with green companies rather than with non-green (or "less green") companies. Consumers, whether they be end-users of the production of an entity, or a downstream consumer, may be willing to pay more to deal with a company that is green. In the case of downstream customers, doing business with a green upstream provider may have the effect of lowering the company's overall carbon footprint. With respect to end consumers, many such people are environmentally conscientious and would prefer to purchase goods and services from green companies, regardless of whether or not the goods and services are being offered at the lowest market price. Likewise, many investors wish to have a green portfolio, and institutional investing funds have been established that will only invest in green companies. Therefore, companies may be rewarded for being green and may therefore wish to re-engineer themselves and their products to be as environmentally friendly as possible.

Therefore, there is need of a means to assess the degree of "green-ness" of an entity, to compare it to other similar entities, and to allow the entity to maximize the return on its green investment by making use of it as a marketing tool. There is a need therefore, of a method of marketing which is based on the desire to reward those companies that have made significant efforts to become green.

SUMMARY OF THE INVENTION

Disclosed herein is a system for rating a company based on its degree of green-ness and a way to utilize that rating as a marketing tool for the company. The rating will represent the company's environmental performance in a simple and readily understandable way.

In one aspect of the invention, companies are rated based on several factors, but principally based on their carbon footprint, against other companies in their same industrial sector, with the rating serving as a relative indicator of the degree of green-ness of the company with respect to the companies that it is rated against. A company's emissions may be normalized based on size within their industrial sector and in such a case, would only be rated against other companies in a size-adjusted manner. The adjustment for size may take the form of an emissions 'rate'—that is, emissions per unit size. There are several possible units of size, and these measures of emissions rate per unit size are often termed 'emissions intensity' by those of skill in the art. For instance, GHG emissions might be measured as a function of sales revenue, expressing the emissions rate as metric tons of $CO_2$ per unit of sales (for example, per $1K or $1M in sales). Such a metric would be described as 'emissions intensity per unit sales'. Other size-related metrics, such as square-footage of facilities, number of employees, or industry-specific measures using units of output such as metric tonnage of steel or cement, or Kilowatt-Hours, produced may also be used, alone or in combination.

Alternatively, companies may be subdivided within their industrial sector and in such a case may only compared to other companies of comparable size.

Either of the rating methods above may be relative to other companies operating in the same sector, but in these embodiments, the whole sector may be represented in the ratings.

In an alternate embodiment, the rating may be based on a "premiership" model, in which, once the size-adjusted data has been compared, only a specified top percentage of a sector will be rated. This will have the effect of making the entry barrier higher for even the lowest rating in a particular category. In another embodiment there may be a shift, over time, from the premiership model to the whole sector model, as all entities within the sector may improve their performance relative to the criteria used in the ratings process. That is, the initial premiership model may be adjusted to a model allowing ratings allocation for all entities within a sector. In this embodiment, the initial top entities within the premiership model may be allowed a rating higher than the original top rating permitted at the inception of the Greenstar service Companies may be rated relative to virtual model companies in their sector. For example, real companies may be compared to a virtual model of a "green superstar" company to see if they are worthy of receiving the highest green-ness rating in their sector. Likewise, a virtual model of an "ostrich" company (that is, a company that chooses to ignore the problem and has taken no steps whatsoever to improve its green-ness) will be used to determine the lowest ratings in the sector.

In an alternate embodiment, the rating could be an absolute rating which is dependent upon specific achievements related to improving the green-ness of the company. Utilizing such a rating scheme, it would theoretically be possible for all companies to achieve the highest rating.

A sector may be based on, for example, the type of products produced or services rendered, or may be dependent on other factors such as emissions profiles. Comparisons may be done intra-sector or intra-subsector as appropriate. As previously stated, the sector may be subdivided based on size, such that smaller companies are not competing against larger companies for ratings, or the ratings may be normalized to take into account differences in the size of firms in the same industrial sector.

The rating itself may be based on the company's operational carbon footprint, taking into account only Scope 1 and 2 emissions, or, optionally, may include Scope 3 emissions, such as upstream and downstream carbon footprints and employee or consumer travel. It may also take other, sector-specific factors into account, which may include recycling practices and other pollutants emitted which are not readily reducible to equivalent units of carbon dioxide.

To assess companies in a particular sector to determine their relative green ratings, an assessment system administered by the Greenstar company and performed either by the Greenstar company or by a third party entity will be used. Preferably, the assessment system will utilize already-existing data regarding each companies' efforts, such as, for example, the results of self-assessments and self-disclosures of carbon emissions and the reports of consultancies or other agencies. It may take into account both upstream and downstream emission factors. Other upstream, operational and downstream industry-specific factors may also be considered. Efforts at carbon offsetting may also be taken into account in calculating the net emissions and final rating. Other publicly-available information may also be used. All such data may be verifiable by audit. A detailed description of one embodiment of such an assessment system is provided herein.

Assessments may be re-evaluated on a periodic basis, preferably quarterly—however the data availability is such that annual re-evaluation is the most likely in practical terms. Companies wishing to be re-assessed prior to their next assessment date, for example, those that may have undertaken green-related efforts, may pay a fee for an early re-assessment. Ultimately, companies may be required to pay a fee to participate in the program.

In another aspect of the invention, an indicia is used as an indication of each company's rating within their industry sector. In the preferred embodiment, a star system is utilized that awards a number of stars based on the company's rating, although the symbolism used for the indicia is not meant to the limited thereby. The star system may be utilized in the marketing of the company, such as on websites, in print and TV advertisements, on packaging, vehicles, letterheads, business cards, e-mail signatures, etc. Preferably, the stars will have a graphical appearance that reflects their green status, such as by being colored green.

In yet another aspect of the invention, the green rating received by companies will be integrated with popular internet search engines, such as Google® and Yahoo!®, such that when a company's link comes up as the result of a user-initiated search, the number of stars in the rating awarded to that company will appear in close proximity to the search result. In addition, there may be ways to search for companies that are specifically tied to the use of the Greenstar rating as a search criteria. For instance, companies may receive top billing in a list of search results based on their Greenstar rating, or users may choose a search that is filtered by Greenstar ratings by requesting that only companies having a Greenstar rating or having achieved a certain Greenstar rating appear in the search results. This is likely to have the effect of increasing the desire of non-member companies to be included in the ratings process, as, over time, increasing numbers of end users opt for the green-ratings-filtered search. In addition, the star indicia should appear when a company's link appears in a sponsored list of search results.

In another embodiment, a search engine's filtered search feature is further nuanced by the use of the numerical 'Outcome Values' arising from the ratings algorithm in use and their incorporation into the scoring metrics that search engines use to determine a search result's hierarchical placement on the results page. Thus, the companies having Greenstar ratings would be returned closer to the top of the list of results than they would otherwise be listed, but in an order that is a function of their overall rating.

In another embodiment the Greenstar ratings filtered search is organized as a discrete 'vertical' search within the search engine. Examples of existing vertical searches available on popular search engines include book searches, map searches, news searches, image searches, among others. In existing 'verticals' a user may enter a keyword search term in the usual way, but have only results that are images, or books titles, for example, returned by the search. In such an embodiment under the current invention, a part of the search engine, alternative search button, or a specific page on the search engine site may be dedicated to the Greenstar ratings-driven vertical search. That is, a vertical search whose primary search criteria is the returning of companies acting to lower their carbon footprint. Again, the product or keyword being searched for could be entered into a search-term box in the usual way.

In a further embodiment of the invention, the 'vertical search' results from the Greenstar ratings driven vertical may be incorporated with other results on the search engine search results page for those search engines offering a 'blended search' feature. Blended search in this context means the returning by the search engine of search results that come from a blend of the vertical searches it has access to, and the organic web. In some form of blended search the search engines may preferentially ensure that multiple vertical search results come up on the first page, taking precedence over the other ranking algorithms used. For example, in a ten-result display, a certain keyword may yield two image results, a book result, a map result, two news stories and four organic web search results on the first page. In blended search these results are often presented under a descriptive title, for instance 'news results', with a list of results underneath as subheadings. Greenstar results featured in blended search may work in the same way, where the list of subheading results is made of company names being returned by the keyword, with their ratings indicia displayed next to them.

In another embodiment of the invention, the automated decision whether to include display of ratings indicia next to company names on the page, or whether to preferentially return Greenstar ratings-driven vertical search results in a blended search feature, may be determined by information 'known' by the search engine about that user's interests and search history, and personalization of the search experience resulting from that information. One method of analyzing the user's interests is automated analysis of 'clickstream' data, and a user may be deemed to be interested in, and so shown, the ratings indicia in a standard search, or the Greenstar ratings-driven results list in a blended search, only if they had clicked on relatively high numbers of carbon-footprint related, general environmental, or ethical consumer-driven sites for instance, in the past.

In another aspect of the invention, there is a website dedicated to the Greenstar rating system which will serve several functions. First, when a rated company's link is displayed with the Greenstar ratings as part of the results of a user-initiated search on a search engine page, the user may click on the stars and be taken to a page on the Greenstar website which is dedicated to that particular company. The page may contain, for example, the company's logo, news stories about the company, descriptions of green-related efforts undertaken by the company, and a click-through link to the company's home page. The page on the Greenstar website may be somewhat configurable and maintainable by the rated company.

In another aspect of the invention, there may be a facility on the Greenstar website to allow rated member companies to network or communicate with other member companies, for instance those who form a part of its upstream or downstream supply chains. This networking may take a form similar to existing online social or business networking sites, and may include the ability to display the logos or other symbols relating to the other members in a network or, other information relating to the networked members. There may be various options for security and data protection within the site. In addition, a member company may opt to display its networked members on its landing page or on other pages viewable by consumers visiting the Greenstar website.

In another aspect of the invention, the Greenstar website may provide to its member companies the ability to have their suppliers submit their emissions and other data to the Greenstar database in an automated manner to eliminate the need for each rated company to collect and enter data regarding the emissions of companies in its supply chain. This may be incorporated into the networking function and there may, optionally, be a separate fee levied for this service.

In another aspect of the invention, rated member companies who wish to network with other companies within the Greenstar site may define networks and invite other companies to join using an automatic process administered by Greenstar. This may involve the sending of emails, printed invitations or other communications on behalf of the member. Members may be required to supply the contact information or allow access to their online or other contact databases to use this service. Members may avail themselves of this automatic invitation service either when signing up to Greenstar or at a later date.

The Greenstar website may also have pages dedicated to the Greenstar company, and may contain general information about the company, about green efforts in general, recent green-related news stories, descriptions of the rating system, and may act as a search engine that will return only Greenstar rated companies in the results. For example, the user may want to perform a keyword search or see a list of all rated companies in a particular industrial sector. The website will also maintain a database of all rated companies and may provide this information to the search engine websites such that the search engines may determine the proper number of stars to display next to each company's link in its search results, as well as the link to the company's page on the Greenstar website. The Greenstar website may also have the facility to incorporate 'targeted' text advertisements aimed at consumers who may be deemed, by their presence on the site, to have a high level of interest in ethical consumerism and other low-carbon or environmental products and services.

The online stars, or other ratings indicia used, may each have a unique identifying number assigned, with which to monitor and control their presence or appearance remotely. They may be composed of a simple graphic file (for example, GIF) or a programming language (for example JAVA script). They may be programmable to move or draw attention to themselves by such features as 'twinkling', for instance disappearing and appearing rapidly. Programming techniques using 'Flash' may be used for this purpose. Ratings indicia may have tracking or other data attached.

The ratings indicia, in addition to being used on or integrated with search engines, may also be used with any other type of online context now known or later developed, including, but not limited to social networking sites, online maps, satellite photographs, geo-location systems, virtual worlds, and three-dimensional environments. Such now known or later developed online contexts may utilize different methods for the collection of microfees. Such fee collection methods may be customized according to the type of online context with which the Greenstar ratings are being used.

In addition to the display of Greenstar ratings on mobile handsets by virtue of the fact that they have on-line capabilities, the current invention also is intended to cover ratings indicia displayed on mobile handsets as a result of the receipt of text messages, multi-media messages, emails or messaging via any form of social networking service, online or otherwise.

In a final aspect of the invention, the Greenstar rating system may be used to generate income in the form of fees for both the Greenstar company and the search engines. For example, companies may be charged a fee for the display of an informational page on the Greenstar website and may agree to pay a fee for each click-through from the Greenstar website to the company's home page.

Fees may also be generated for use of the Greenstar rating on a search engine website, for example, by charging rated companies a "per impression" fee each time their link is displayed with their Greenstar rating indicia, or a "click through" fee each time a user clicks on the indicia hyperlink. These fees may be shared between the search engine and the Greenstar company.

In one embodiment of the invention, rated companies may have to 'bid' against other rated entities in the same sector for their ratings stars to appear near their name or logo, whenever the stars of said competitor company appear on the same webpage or other online context. Such a bidding system may have a 'floor' value below which none of the entities would be able to display stars.

In addition, rated companies may agree to pay a fee for the display of a Greenstar link on their web page which will take the user to the informational page on the Greenstar website. The Greenstar website may also sell advertising. In general, any way known to those of skill in the art to generate fees using internet-based models may be used, as long as the rating received by a company is not dependent in any way upon the fees paid.

DESCRIPTION OF THE DRAWINGS

FIG. 8 is an example diagram depicting a computer screen showing how results may appear including Greenstar vertical ratings-driven search results incorporated into a blended search.

FIG. 17 shows a worked example of following the process of operating the module in FIG. 16, with test data in tabulated form, for sector of comparable companies U, V, W, X, Y & Z.

DETAILED DESCRIPTION OF THE INVENTION

It is contemplated that the practice of an embodiment of the invention would include a corporate entity for the collection of revenues realized from the use of the green rating and from search engine related fees. As used herein, the term "Greenstar" or "the Greenstar company" will refer to this corporate entity. Likewise, Greenstar will, as part of this invention, own and operate a website, which will be referred to herein as the "Greenstar website." The term "member company" means any company participating in the program by receiving a Greenstar rating. These terms are not meant to be in any way limiting, as to any indicia, symbolism, or color schemes used in the practice of the invention.

It is further assumed that any description of online activity or activity relating to websites and the interaction of users, third party websites and the Greenstar website would necessarily be understood to include standard hardware and software components, including computers, servers, storage devices, networking facilities and hardware, and software source code, that would allow or enable such activity, as would be well known to those of skill in the art, even if not explicitly otherwise mentioned.

Figure 1:
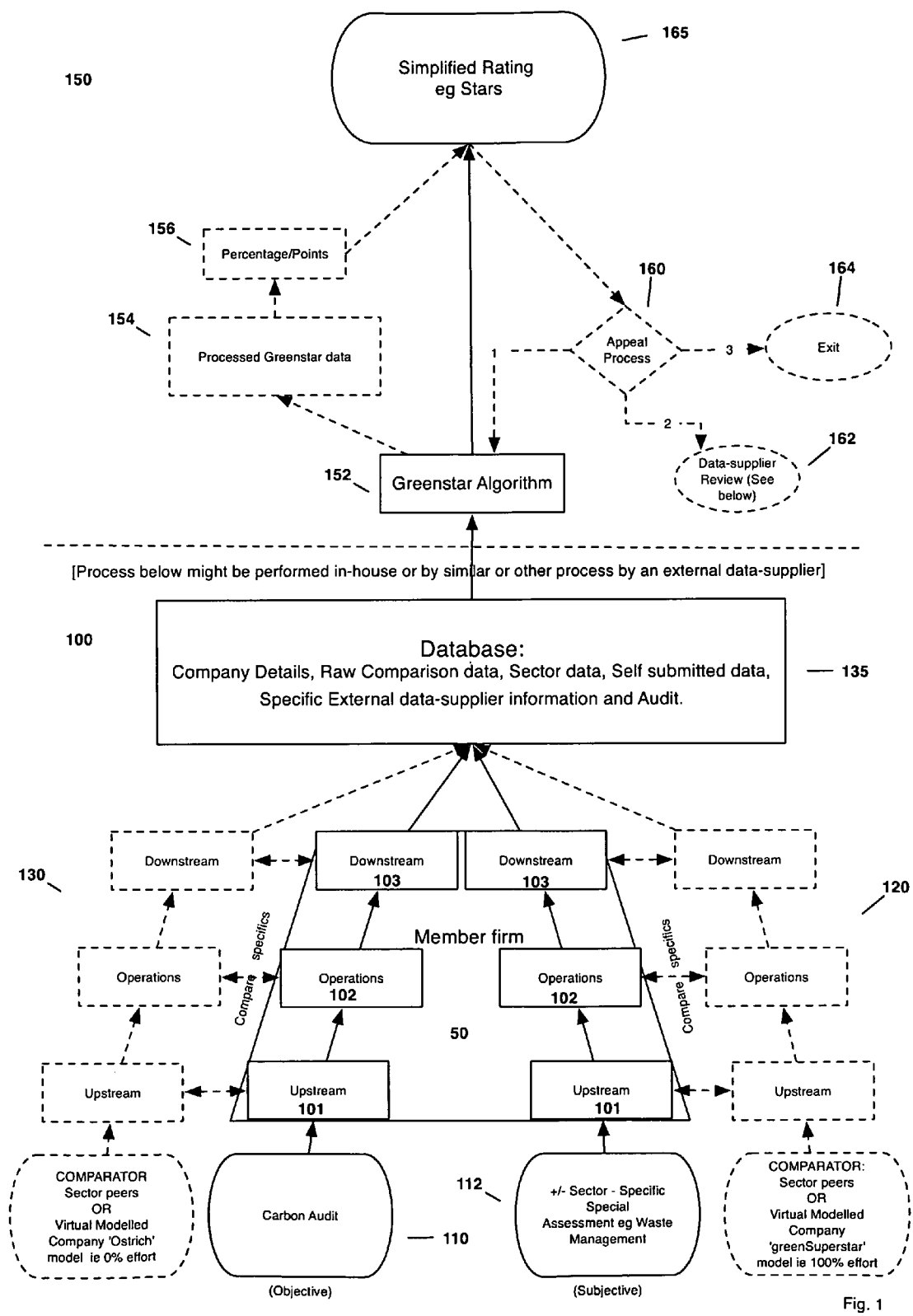
FIG. 1 is a diagram showing the method of arriving at the Greenstar rating for each company in a particular sector.

FIG. 1 shows the process by which the star rating of a member company 50 is achieved. Bottom section 100 of FIG. 1 shows the data collection process wherein data regarding upstream factors 101, operational factors 102 and downstream factors 103 are collected for each member company 50.

There are two types of data which may be collected. First, data regarding the carbon footprint 110 of member company 50 is collected for upstream activities 101, operational activities 102 and downstream activities 103. If upstream and downstream data is not yet available for member company 50, it may optionally be awarded a provisional "partial-dataset" rating based on the operational data, such that the rating would only take into account Scope 1 and Scope 2 emissions. In such cases, the member firms may only be compared to other firms in their sector with partial-datasets. They may receive a rating, which may be indicated by an indicia which is different in some respect from the indicia which is derived from full-dataset (i.e., Scope 1, Scope 2 and Scope 3 emissions data). In addition, sector specific data 112 may optionally be collected for upstream activities 101, operational activities 102 and downstream activities 103.

Both carbon footprint data 110 and sector specific data 112 may be compared with industry model comparators 120 and 130. Upper end comparator 120 is a sector peer or an idealized model company that is considered to a "green superstar" and may be, for example, the highest rated firm in the sector or may be a virtually modeled company who is considered to have made 100% effort in all phases of the supply chain. Lower end comparator 130 may likewise be a sector peer or idealized model company that is considered to be a green "ostrich" company. This may be the company having the lowest ratings in the sector or may be a virtually modeled company having made no effort to improve its green performance or environmental friendliness.

Database 135 contains information about member company 50 as well as all other member companies within the same sector as member company 50, as well as data for all member companies in other sectors. This information may include details about the company, raw data used for comparisons, aggregated sector data and specific external data information from databases and audits.

In an alternative embodiment, database 135 will contain data not only about member companies, but also about non-member companies within each sector, and member companies may be rated against all companies in the industry sector (for which data is available) as a whole and not only against other member companies. In such a case, non-member companies would not receive a rating, although their data would be used to derive ratings for member companies.

The upper portion 150 of FIG. 1 shows the process by which the simplified green rating 165 is obtained. First, data from database 135 is fed into the Greenstar algorithm 152. The algorithm may be any algorithm which takes into account, with the proper weights, all of the data collected regarding member company 50 and all other sector companies within the same sector as member company 50. The algorithm may in fact be different for different industry sectors. In its simplest form for instance, the algorithm in box 152 may comprise ranking of all member firms in a sector by net emissions expressed as a rate per unit size, and awarding ratings indicia to member firms according to their percentile ranking, for example giving a full rating for those ranked in the top 20%. In boxes 154 and 156, the results of executing algorithm 152 using data extracted from database 135 for member company 50 is generated. The raw score 154 may be turned into a percentage score 156 which represents the percentage of the maximum score in the sector which has been achieved by member company 50. The percentage score 156 is then turned into a simplified rating 165 which consists of one or more stars or other symbolized indicia being awarded to the member firm 50. The number of indicia in the preferred embodiment is zero to three but it is understood that the number of indicia used may vary between zero and any number.

In addition to the above, or in an alternative embodiment, member entities may be subject to 'spot check' or other means to ensure that they or their agents have an incentive to comply with the necessary requirements for accurate and correct data-entry. There may be a facility for imposition of penalties, such as exclusion from the system for a certain time-period, following discovery of deliberately misleading or negligently false data.

The Greenstar rating may be calculated by the Greenstar company or may be calculated by an outside, third party. Data used to derive the rating may also be considered verified or unverified. For example, data entered by a member firm about itself may be considered unverified until an audit has been performed or until the data is verified by some other means. In such cases, the member firms may receive an "unverified" rating, which may be indicated by an indicia which is different in some respect from the indicia which is derived from verified data. There may be a time-limit placed those ratings based on unverified data.

If member company 50 is not happy with the outcome of the of the simplified rating 165, there is an appeal process 160 that may be utilized, and may involve review by a different consultancy or verification agency. In box 162 the data utilized in Greenstar algorithm 152 is reviewed for accuracy regarding both the source of the data and the data itself, and the Greenstar algorithm is again executed on the data. Member companies may have the option of opting-out of participation in the program if they receive a rating which is at the lower end of their industry sector.

Figure 2:
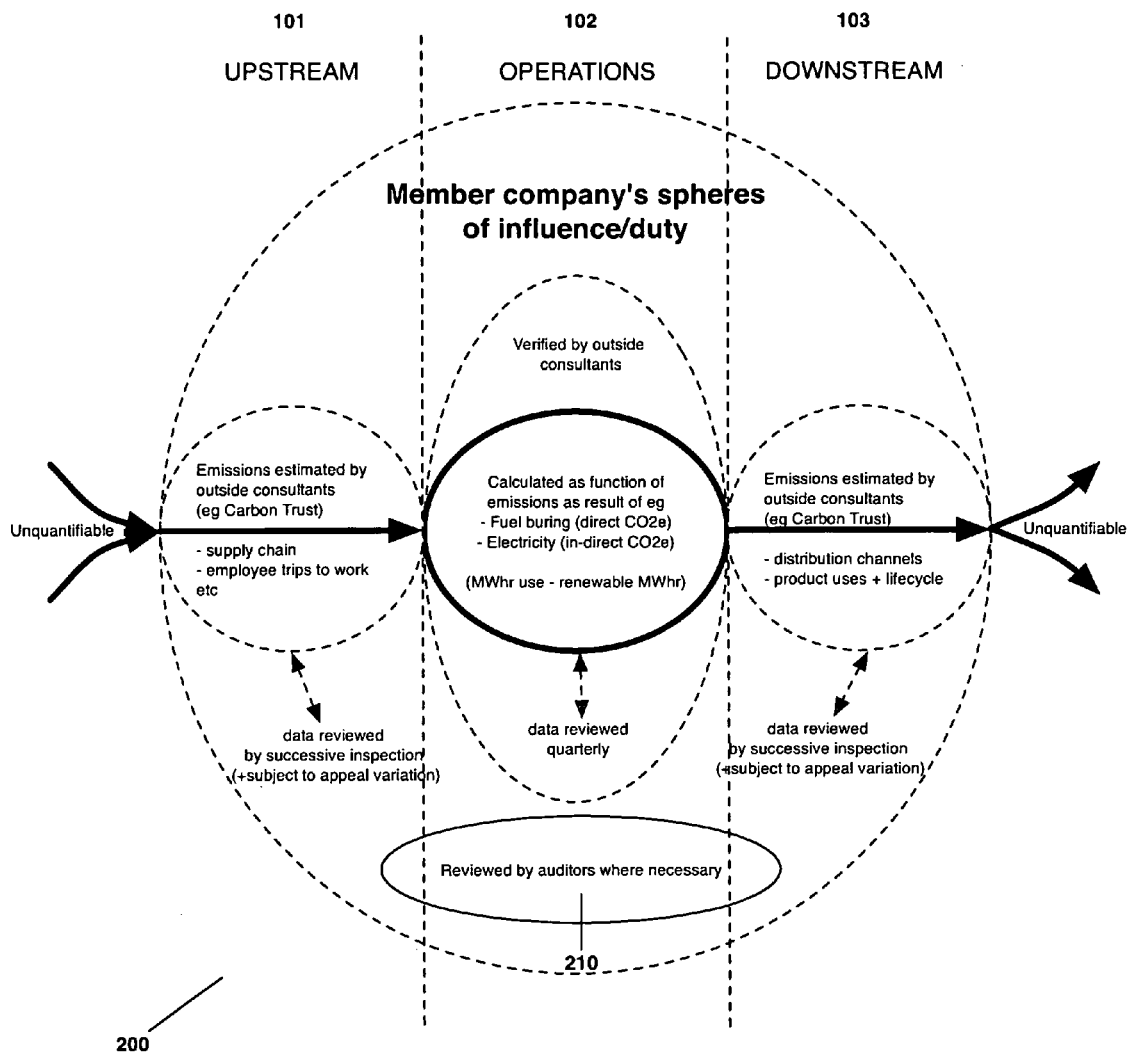
FIG. 2 shows the factors involved in the calculation of the rating.

FIG. 2 shows the carbon footprint related factors 110 which are considered for upstream activities 101, direct operational activities 102 and downstream activities 103 which make up the aggregate rating for each of the member companies 50.

Upstream data 101 may include such items as emissions of suppliers of member companies 50 and the emissions of employees as a result of their business travel and daily trips to and from work. Basically, the emissions of all entities in the supply chain including, for example, suppliers of raw materials and other goods and services may be included. Data which is further upstream 101 which may be two or more steps removed from member company 50 is considered unquantifiable and likely will not be taken into account. However, if suppliers of member company 50 are also member companies, and have received a verified rating, their ratings may be taken into account in calculating the rating of member firm 50. Likewise if twice removed suppliers are member companies, their ratings may be considered in the ratings of the direct suppliers of member firm 50 and, as a result, factors further upstream in the chain are may be considered in that manner.

The operations data 102 consists of the results of operational activity by member company 50 including, for example, direct emissions of carbon dioxide or other greenhouse gases as a result of manufacturing processes or indirect emissions of carbon dioxide/other through the use of other resources such as electrical power. The operations data 102 may be supplied directly by member firm 50, in which case it may be considered unverified, or may be verified by outside consultants or by an audit by independent auditors 210 where necessary. Preferably the data for operations phase 102 will be reviewed periodically.

Downstream data 103 consists of emissions by downstream entities within the sphere of influence of member firm 50 which may include, for example, distribution channels and the effect of the use by consumers of the products produced by member company 50 over the life cycle of the products. For example, the emissions of a trucking company utilized to distribute the products of member firm 50 may be utilized or, if the trucking company is also a member company, its rating may be taken into account. As with upstream data 101, twice removed downstream suppliers who are member companies and have been rated within their sectors may have those ratings taken into account in the calculation of the direct suppliers, and ultimately in the calculation of the rating of member company 50. Data further downstream, i.e. more then one step removed from member firm 50, may be considered unquantifiable, but may be taken into consideration, in the calculation of the ratings of downstream entities, and of their own downstream entities.

The effects of upstream activities 101 and downstream activities 103 may be taken into account in two ways, first, if the upstream or downstream supplier is a member company, their rating may be taken into account, and will thus necessarily include data regarding twice removed upstream and downstream suppliers of member company 50. Alternatively, raw data regarding upstream and downstream supplier may be used, in which case it may be impossible to take into account the effects of twice removed suppliers in the calculation of the rating of member company 50. The exact processes used to determine relevance and impacts of upstream and downstream suppliers may vary by industry sector but is intended to be standardized within industry sector for intra-sector comparison of member firms. The downstream activities related to product use and lifecycle assessments may be directly incorporated into the rating of member company 50. This may be achieved by consideration of the relative efficiency—for example, in terms of fuel efficiency for fuel burning products, or electrical energy efficiency for electrical equipment—versus the comparable products made by competing firms.

In an alternative embodiment, those downstream activities related to product use and product lifecycle assessments may be represented by a distinct and separate set of ratings indicia. Specifically, this rating would consider the environmental efficiency of the products themselves based on their ongoing use by the downstream consumer (i.e. outside of the control of the member company which made the product). This separate rating would be awarded instead of or in addition to the previously described rating (i.e. the rating resulting from the member entity's operations and upstream/downstream assessments), and would be awarded according to related but separate criteria focusing on the product in isolation. This separate ratings indicia may be similar in style, but differ by color or design, and may be displayed adjacent to the previously described ratings indicia, on all of the same media, and with otherwise identical uses and functionality. The types of products of particular suitability for this type of rating would include those products which themselves can create emissions or effect environmental damage, and may include, for example, transportation products such as aircraft, automobiles and ships, and power-consuming products such as computers, home-entertainment systems and 'white goods' such as washing machines.

The inclusion of upstream and downstream data in the calculation of the rating of member company 50 provides an incentive for member company 50 to pick the most efficient suppliers of goods and services, both upstream and downstream. The inclusion of the optional product-related rating described above may provide an additional incentive for member company 50 to develop and produce the most energy-efficient products possible.

Figure 3:
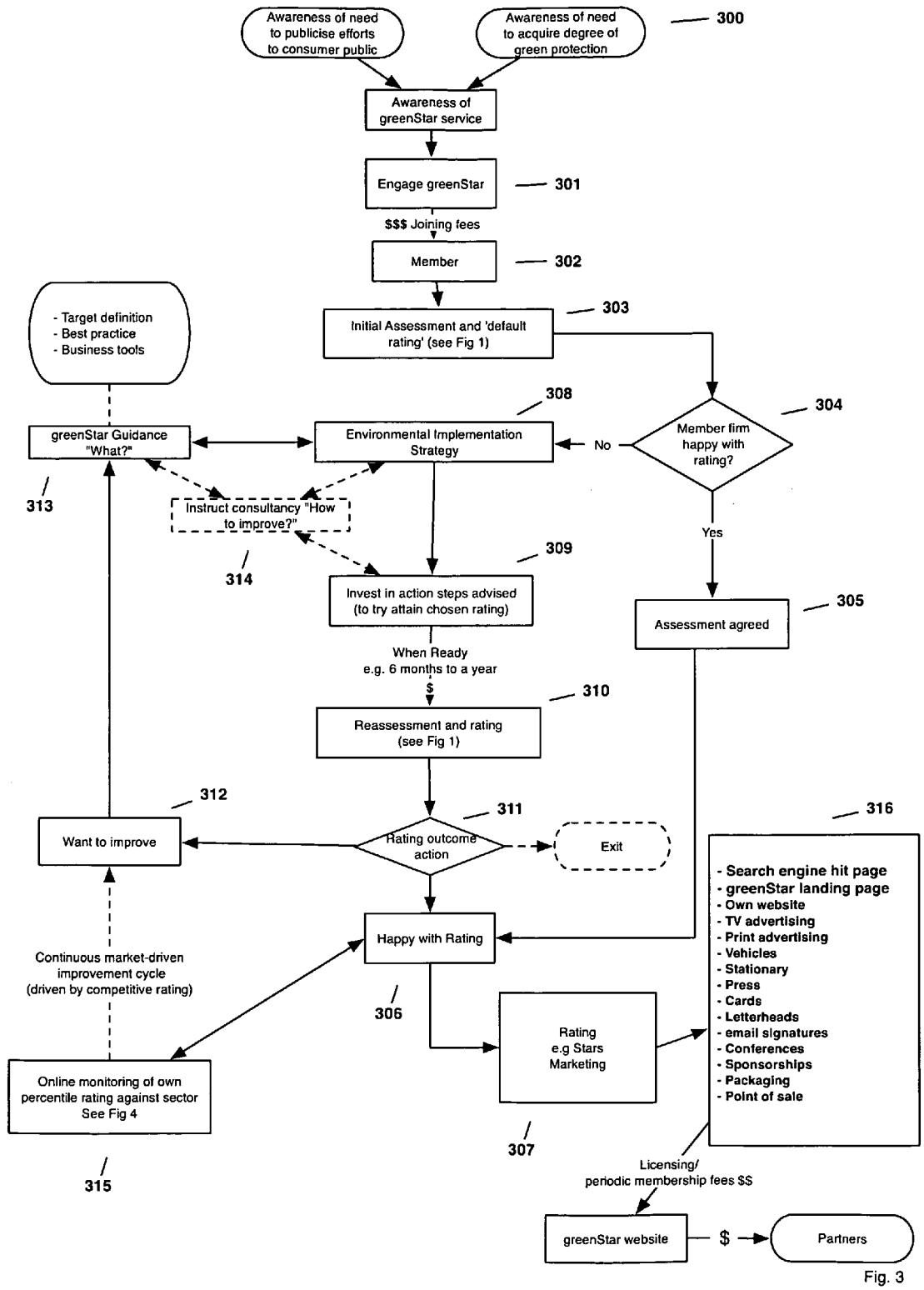
FIG. 3 shows the utilization of the system from the rated companies point of view.

FIG. 3 shows the interaction between a member company and the Greenstar company. In boxes 300, an outside company first becomes aware of the need to publicize its efforts in the green arena to the consumer public and also becomes aware of the need to acquire a degree of 'green protection' such that sufficient environmental responsibility may be demonstrated to protect against unfavorable press, and public criticism. One or both of these items may lead to an awareness of the Greenstar rating service. In box 301 the outside company may engage Greenstar and become a member company 50 in box 302. Member companies 50 may be required to pay a fee to join the Greenstar rating service, or, alternatively, may be allowed to join and become a member company for no fee. This policy may vary by sector or size of the company in question.

In box 303 an initial assessment of the new member company 50 is performed. The initial assessment may be based upon publicly available data or data which is entered by the member company itself and may be calculated in-house by Greenstar, or by an outside third party company. As previously discussed, data entered by member company 50 regarding itself may be considered unvalidated and may lead to a different kind of rating being awarded to the company indicating the unvalidated status of the data, until the data is able to be verified. The data entered includes upstream data 101, operational data 102 and downstream data 103, as previously discussed with respect to FIGS. 1 and 2.

The rating is awarded in box 303 and, in box 304, member company 50 decides whether it is happy with the rating. If member company 50 is happy and agrees with the assessment in box 305, it may start to use the rating in box 307 in the various ways described in box 316, including, but not limited to, use in its own advertising, both print and television, as well as use on items such as stationary, business cards, letterheads, email signatures, web page and via integrated use on the search engines as will be discussed below. Optionally, license fees may be collected by Greenstar for these types of uses.

Online monitoring of the percentile rating of member company 50 against other companies in its sector can be performed in box 315. Member company 50 may decide it wants to improve its rating in box 312, driven either by an initial unhappiness with its rating or by an unhappiness with its rating brought upon by continuous monitoring and improvement of other firms in the sector. In box 313, member company 50 may receive guidance from Greenstar, or a third-party consultant brokered or controlled by Greenstar, as to ways that the rating may be improved, for example, suggesting that member company 50 switch to another, higher rated supplier of raw materials or power. In box 314 Greenstar may provide consulting services for a fee or at no charge to member company 50, providing guidance as to what factors may be modified to effect the maximum improvement in rating of member company 50. In box 308, member company 50 may employ an environmental implementation strategy to implement the advice of the Greenstar consulting and in 309 may invest in various action steps to obtain a higher rating. In box 310, after a period of time wherein the action steps taken by member company 50 to improve its rating have taken effect, a reassessment may be performed and a new rating issued. In box 311, member company 50 may examine its rating and decide again in box 306 if it is happy with its current rating.

Figure 4:
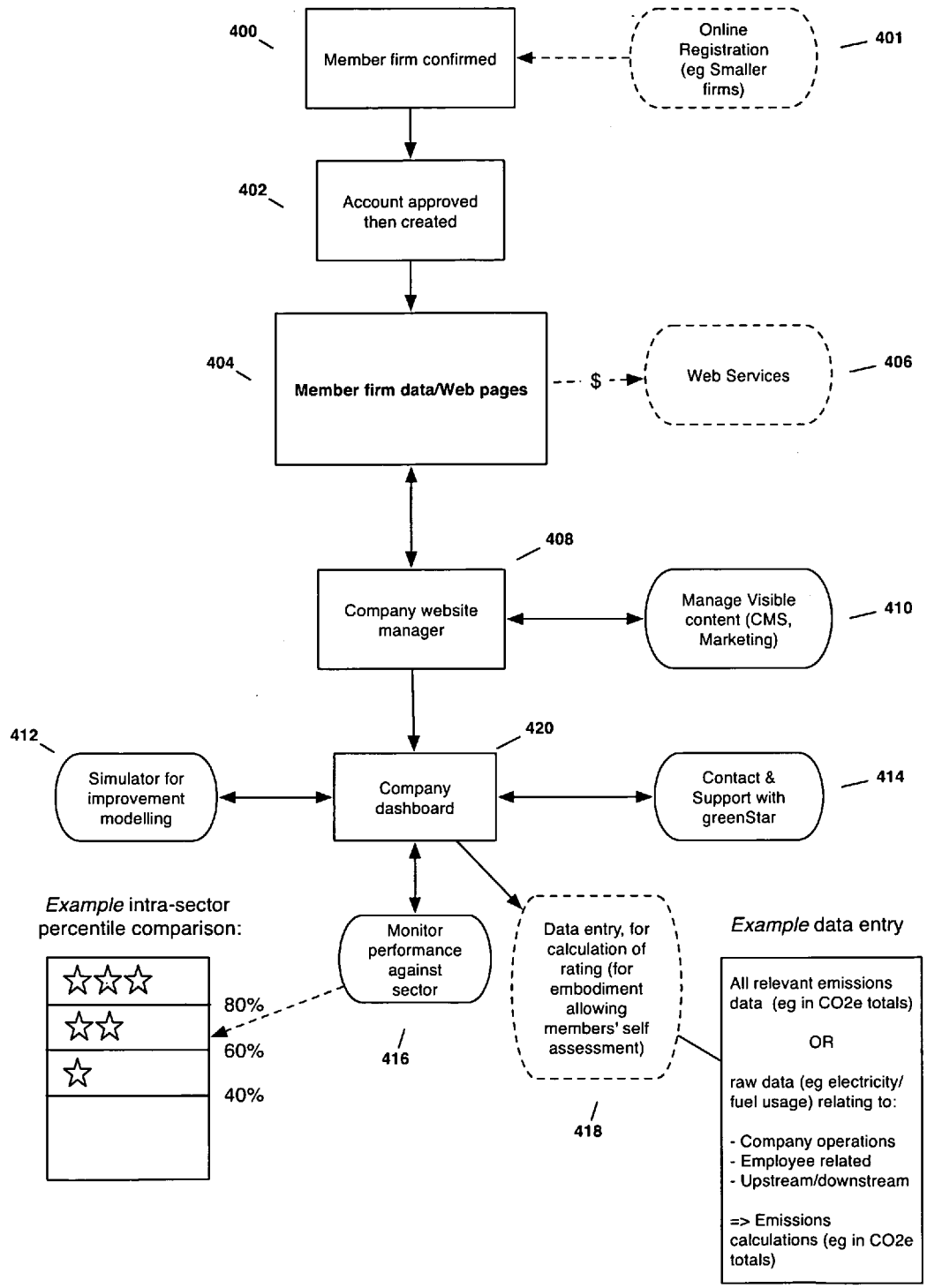
FIG. 4 is a flow chart showing the flow of control on the website of the rating company.

FIG. 4 shows the manner in which member companies interact with the Greenstar website and receive services therefrom. In box 400, the outside company is confirmed as being a legitimate company and in box 402 the new account will be approved and created on the Greenstar website. Member company 50, in box 400 may be required to submit an application which may contain extensive data regarding its green efforts and current carbon footprint. This may be submitted online or via another electronic form or via paper. This data may also be obtained from verifiable third party sources by Greenstar. Smaller member companies, in box 401 may also fill out a simplified online registration form to become a member of the Greenstar rating system. In box 404 the company's data is stored in a Greenstar website database and a web landing page is created for the firm. Web services may be provided on the Greenstar website which are specific to each individual member company in box 406.

A central dashboard or control page in box 420, provides a place where member companies may choose from various services. In box 408, the member companies website manager may administer the online landing page of member company 50 and, in box 410, will be able to manage the visible content which appears on the landing page including, for example, logos, links to or actual copies of news stories which may highlight the company's green efforts and other marketing materials which may describe in detail the efforts undertaken by the company to implement its green program.

From dashboard 420, member company 50, in box 412, may run a simulator which will allow it to vary various factors to show their potential effect on the Greenstar rating of member company 50. For example, member company 50 may indicate that it wishes to see the effect on its Greenstar rating of switching to an energy tariff that has a higher proportion of renewable electricity generation than its current energy tariff. Various scenarios may be run by the simulator to allow the member companies to find ways to maximize their Greenstar rating.

In box 414, the member companies may contact Greenstar for support with any issue encountered in utilization of the website or with the rating system itself.

In box 416, the Greenstar website provides a means for member companies to monitor their current performance against their sector peers. This facility may allow the member companies to see their actual percentage rating in their sector and will show the various categories of Greenstar ratings for various ranges of performance percentage within the sector. For example, with respect to FIG. 4, member companies having a percentage score below 40% may not receive any stars while member companies having a rating of 80% or above may receive three stars with respect to other companies within their sector.

In box 418, in certain embodiments of the invention, member companies may be allowed to enter data and perform a self reporting process for use in the calculation of their Greenstar rating. Such data, which is entered by member companies on their own behalf, may be subject to spot checks for accuracy or the rating may be flagged as being based upon unverified data. There may be a facility for an outside firm which provides verification of the data entered by the member companies on their own behalf which will allow the rating to be reflected as a verified rating. Such an outside firm may be an accredited service partner of Greenstar and have its own dashboard on the Greenstar website allowing it to verify a given member company's rating without having to contact Greenstar directly. In this embodiment of the invention (i.e. those embodiments allowing member firms to enter their own data to generate Greenstar ratings) there may also be a facility for employees of the member company to log-on and enter data regarding their individual activities related to their employment that the member company may not have recorded in a central record. Such activities may include, for example, distance traveled to work, the type of vehicle driven, work-related mileage and travel undertaken in the course of fulfilling work duties, such as flight mileage per year. The individual log on account details may contain and be tied to the employee's company email address.

Figure 5:
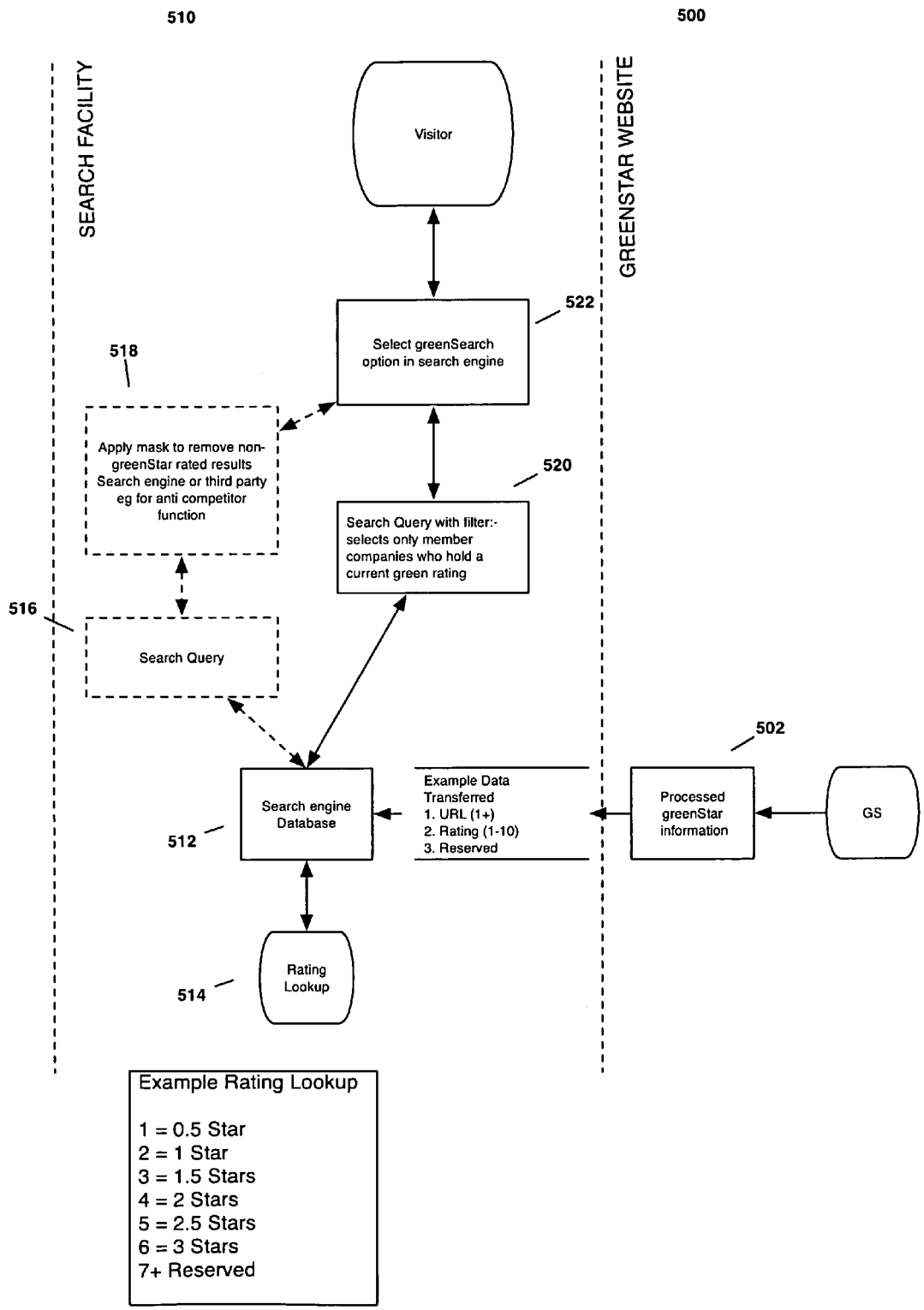
FIG. 5 shows the relationship between the Greenstar information and the search engine, the flow of data from the Greenstar website to the search engine website, and the process on the search engine wherein the Greenstar rating system is integrated into the normal search engine operations.

FIG. 5 shows the relationship between the Greenstar website and the search engines 510 which are partnered with the Greenstar company. The Greenstar website 500 contains a database 502 of processed Greenstar rating information on various member companies. The processed information will include such information as the ratings of each member company within that company's industrial sector, links to the companies' informational page on the Greenstar website 500, links to each company's own website, and other such information as is required by search engine 510 for integration of the Greenstar information onto its search result pages.

Search engine 510 will include a search engine database 512 which may reflect the data contained in database 502 on The Greenstar website and which may be used to show Greenstar ratings related to companies as the companies pop up on search result pages. Ratings lookup 514 will translate the company's rating from a numerical rating to a simplified ratings indicia such as a star rating.

With respect to the operation of the search engine and the differences between the normal searching operation and the search operation with the Greenstar rating system integrated therein, in 522, the user may select an option to utilize the search engines' capabilities but to only select results having the Greenstar rating. In this case, in box 518 a mask is applied to the normal search and submitted as the search query in 516 to the search engine database. The mask would remove any non-Greenstar rated results from the search engine. In box 520, should the user not choose to perform the search filtered by the Greenstar system the normal search typed in by the user is utilized to search the search engine database 512.

Figure 6:
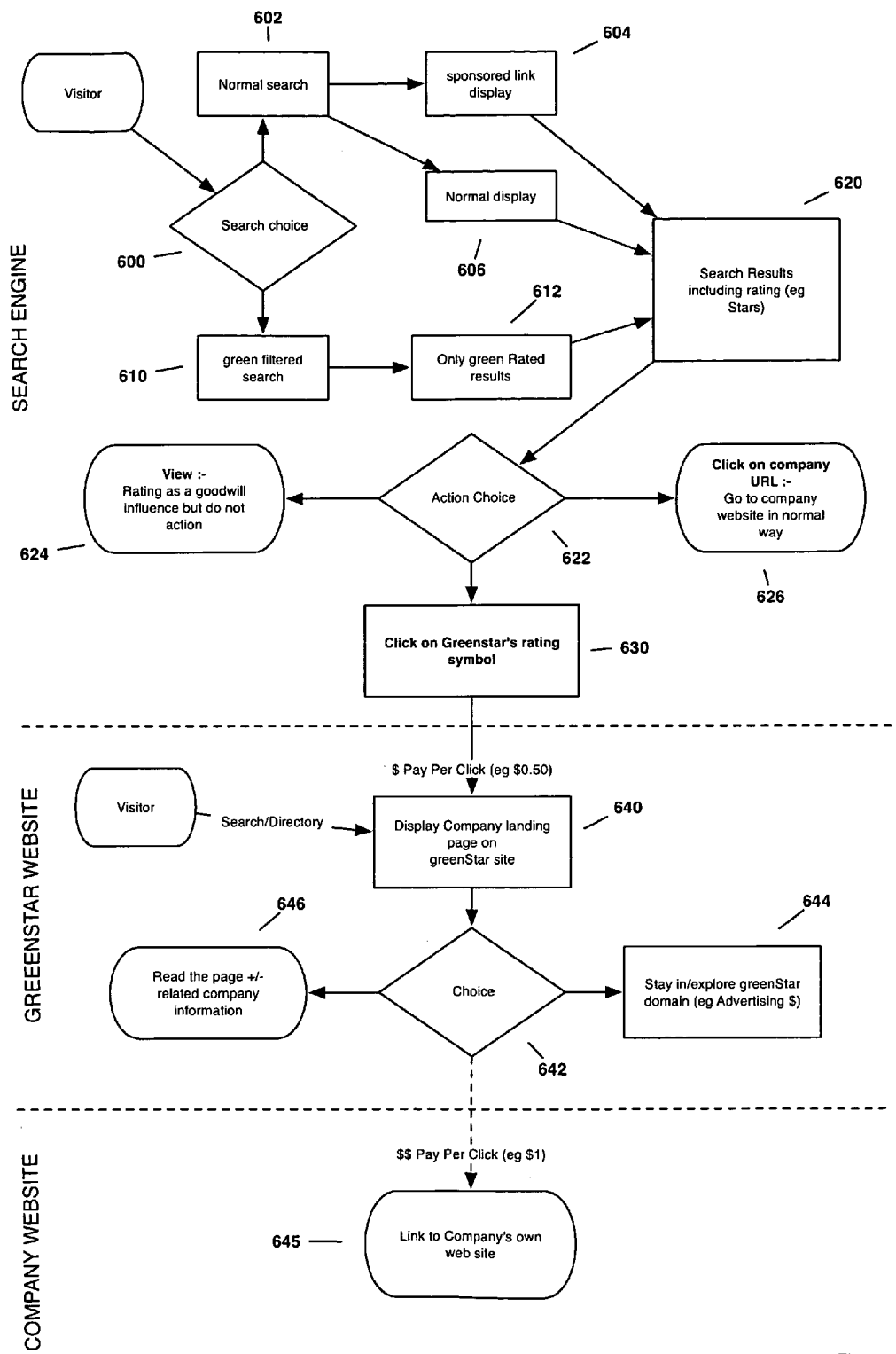
FIG. 6 shows how the Greenstar system and search engine integrated with the Greenstar system appear from a consumers point of view.

FIG. 6 shows the interaction of a typical user of a partnered search engine 510 which utilizes the Greenstar rating system. In box 600, the user has a choice of performing a normal search engine search in box 602, as is well understood by users of search pages, or performing a green filtered search in box 610. The green filtered search in box 610 returns results consisting only of companies that have been rated by the green rating system in box 610 and displays the search results including the rating in box 620.

The rating is preferably shown in the form a series of indicia consisting of green stars indicating the company's relative green strength within its industry sector. Of course any variation on the star rating system could be used including different shapes, different colors, different symbols (such as, for example, leaves, trees, or planet symbols), different letters or words (for example, containing the word 'green'), and different means of showing the difference between ratings based upon verified and unverified data. A possible option in the display of the rating is that the ratings which are based upon unverified data may be shown in a pale or faded color while green ratings which are based on verified data may be shown in a more vibrant color. Another option in the display of the ratings indicia is to show the difference between those ratings based on incomplete datasets by smaller ratings indicia, for example, smaller star symbols, relative to those ratings which are based on full datasets.

Should the user choose to do the normal search engine search in box 602, a normal display in box 606 is generated and will contain both results which include member companies and those companies which are not members of the green rating system. Preferably, in box 620 the search results from the normal internet search will include the number of green rating stars beside those companies that are members of the Greenstar rating system and which have received ratings.

In box 604, the member companies may also appear in the sponsored links list of the search results page, with their Greenstar rating displayed.

Optionally, a "cost per impression" microfee may be charged to member companies to have their URL displayed with the green rating symbol, which may vary depending on whether the member company is listed in the normal search results, or in the sponsored links section of the search results page. Any such microfee may be divided between Greenstar and the search engine 510, in any manner.

From the list of search results including the rating indicia in box 620, the user can take several actions in box 622. Naturally, in box 624 the user can peruse the list of companies in the search results to see which include the Greenstar rating and which companies have Greenstar ratings which are higher or lower than other companies. In box 626, the user may click directly on the company's URL link which appears in the search results in the manner well understood by all users of search engines. This will result in the user being taken directly to the member company's website.

In box 630, the user may instead click on the Greenstar rating symbol which is displayed next to the company's URL and be taken to the member company's landing page on The Greenstar website at box 640. The clicking of the Greenstar symbol to reach the company's landing page on the Greenstar site may generate a "cost per click" microfee on a per click basis. This microfee may also be split between the search engine and Greenstar in any manner.

From the company's landing page on the Greenstar website in box 640, the user may have several choices of action in box 642. In box 646, the user may peruse the company's landing page and read the related information regarding the company. In box 644, the user may stay and explore the other pages within the Greenstar website which may include information on the Greenstar rating system, sector definitions, other companies within the industry sector, the landing pages of other companies within the industry sector or may include generally all other public accessible pages of the Greenstar website.

In box 642, the user may click through a link to the company's own web page in box 645, which may generate a cost per click microfee payable to Greenstar.

If user chooses to perform a normal search in box 602, the user may also select one of the sponsored link displays 604 which may be displayed separately from the regular search results on the search result page of the search engine website. The sponsored link section of this search engine's results page carries one or more sponsored links wherein a fee is paid by the company to the search engine to include the company's listing in the sponsored link display, upon clicking through the URL. Companies appearing in this section of the display with the Greenstar logo may pay both a cost per impression microfee, which is paid each time the company's name is displayed and a cost per click microfee which is paid whenever a user clicks on the Greenstar ratings stars to be taken to the company's landing page on the Greenstar website. There may also be a revenue sharing agreement for clicking through the URL in the normal way, but in the presence of the Greenstar rating displayed.

Figure 7:
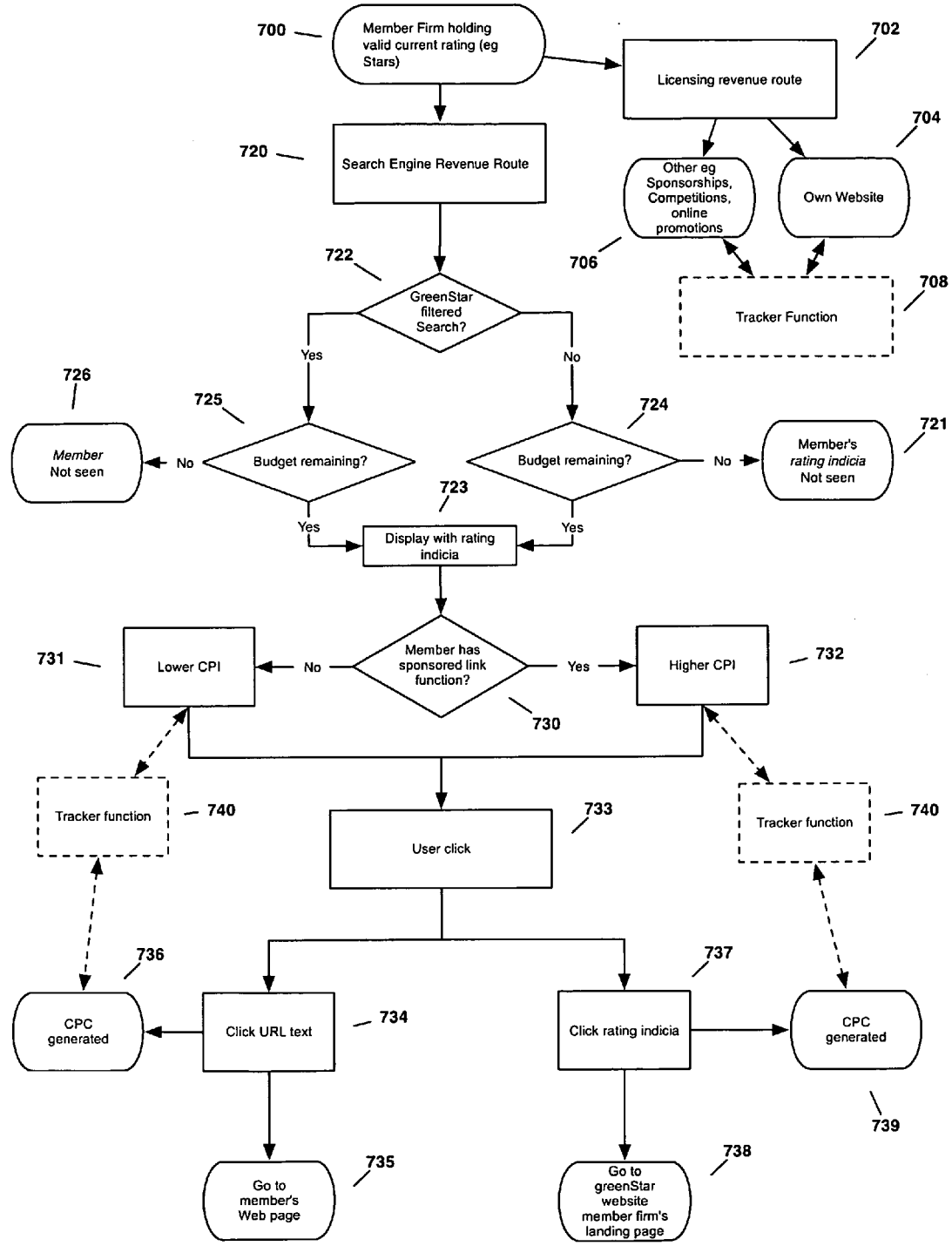
FIG. 7 shows various revenue models that may be utilized with the Greenstar system.

FIG. 7 shows various revenue models which may be usable with the Greenstar rating system. Revenues may be realized from member firms holding a current rating in box 700 by one or both of two principal means, a licensing route and a search engine route.

Licensing route 702 involves licensing payments flowing from the member company back to Greenstar for online uses of the Greenstar rating system indicia. For example, member firm 700 may utilize the Greenstar rating indicia on their own website in box 704 or on any other impressions made by the company in an online manner in box 706. Such uses may include, for example, e-mails to potential customers, sponsorships, competitions and other online type promotions. Preferably, there will be some means, as shown in box 708, of tracking the usage of the Greenstar rating indicia in the online world for purposes of insuring that the proper licensing fees are paid by the member companies to Greenstar. In addition, licensing fees may also be charged for use of the indicia in off-line contexts.

Fees may also be generated through the integration of the Greenstar rating system with search engines in box 720. In box 722, a user may perform a Greenstar filtered search or a standard search. In box 724, wherein the user is performing a standard, non-green filtered search, member companies may set up daily budgets for the payment of microfees when an impression is made on the search page website by having the Greenstar rating indicia appear with the company's URL link. If the company has funds remaining in its daily budget, the company's link is shown, in box 723 with the Greenstar rating indicia shown. Otherwise, the member company's URL link will be displayed in the results list without the Greenstar rating indicia, in box 721.

In box 725, wherein the user is performing a Greenstar filtered search (where ordinarily only Greenstar rated member companies would appear in the results), member companies may set up a daily budget for the payment of "per impression" microfees. When this daily budget is exhausted, the member company's URL Link is no longer shown in the results list, at box 726, otherwise, in box 723, the member company's URL link appears, with the Greenstar rating indicia shown. The daily budget may be shared between the GreenStar-filtered search and the standard search, or may be set separately.

In box 730 it is determined if the link being displayed is a sponsored link. Both sponsored links and non-sponsored links may optionally pay a cost per impression microfee that may be shared in some manner between the search engine and Greenstar. This fee may vary depending on whether the member company's URL link appears in the regular search results list or in the sponsored links list. For example, if the link is not a sponsored link, a lower cost per impression microfee may be charged in box 731, while a company in a sponsored link list may pay a higher cost per impression microfee in box 732.

Regardless of whether the member company's link is shown in the normal section of the search results page or in the sponsored link section of the search results page, a click through either the company's URL link or through the link formed by the Greenstar rating indicia accompanying the company's URL link in box 733 may generate a cost per click microfee that may be shared between the search engine and Greenstar. In box 734, a click on the member company's URL link will take the user to the member company's own website in box 735, and may, in addition, generate a cost per click microfee in box 736. Likewise, if the user clicks on the hyperlink formed by the Greenstar ratings indicia, in box 737, the use is take to the member company's landing page on the Greenstar website in box 738, and, in addition, a microfee may be generated in box 739.

Preferably, microfees generated either as a cost per impression fee or as a cost per click fee will be tracked in box 740 to ensure that the proper fees are allocated to both Greenstar and the search engine.

FIG. 8 shows how a 'blended' search results page may look following a user searching for a keyword, in this case "airline flights", that contains within its mix of results Greenstar ratings, as well as other blended search results, such as news. It can be seen that the Greenstar rated results may also be broken down by subsector—in this case they are divided into those airline carriers offering 'Transatlantic' and 'US Domestic' flights. The appearance of the stars could be monetized using any of the methods previously described. The column on the right showing 'Sponsored links' also displays other examples of ways rated companies may make use of their ratings indicia in communicating their green credentials.

Figure 9:
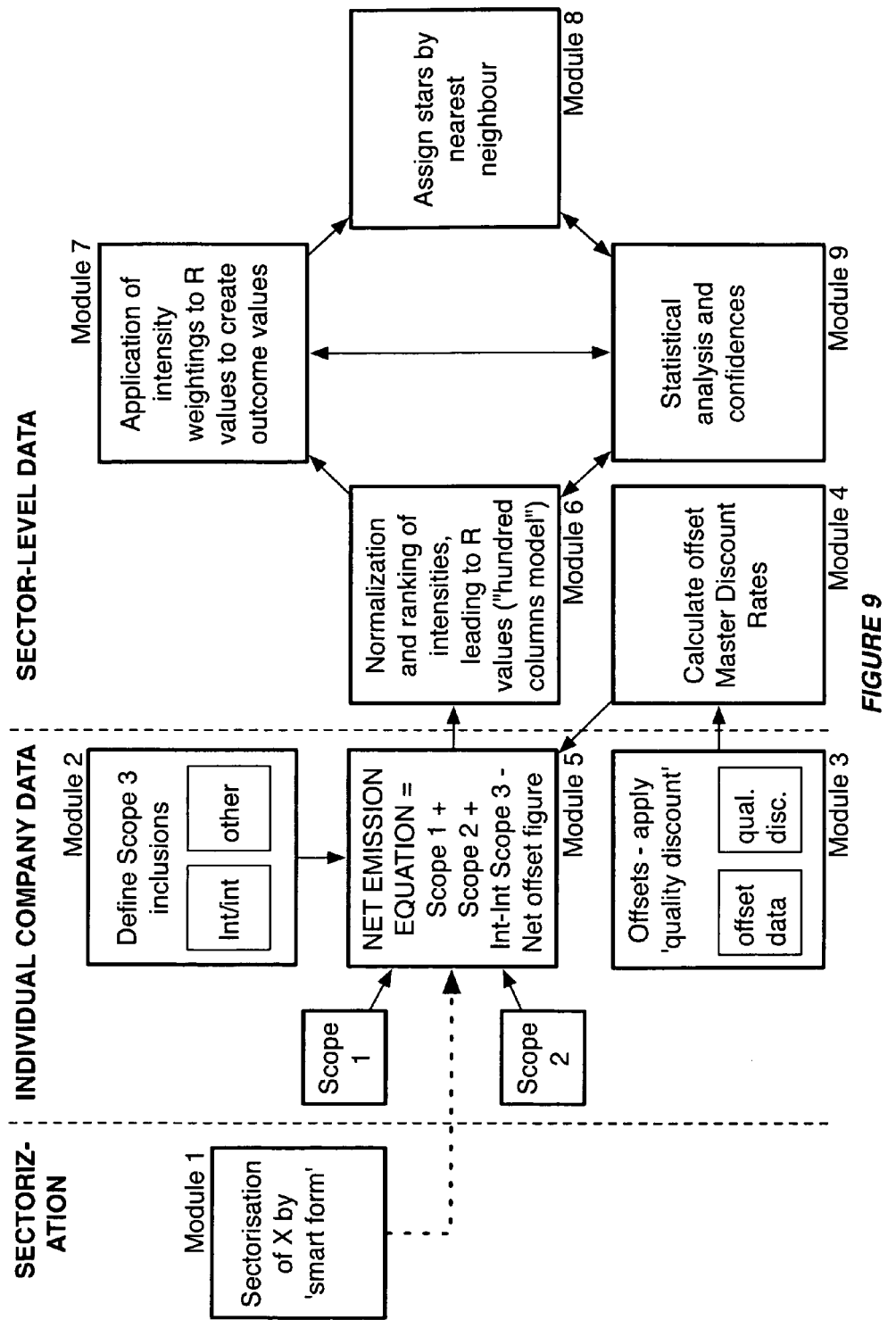
FIG. 9 is a modular overview of a system for calculating the ratings of companies and evaluating them in reference to their sector.

FIG. 9 shows an upper level modular diagram illustrating a system for the calculation of the green rating. It is to be understood that such a system could be implemented in software, using any language as is well known to those in the art. In addition, such software could be run on any computer system, however, the computer system would preferably have a connection to the Internet. The present invention is therefore not meant to be limited in any way to any particular software or hardware implementation. Preferably, entities interacting with the system would access portions of the system over the Internet, for instance, those portions wherein data regarding different types of emissions are entered. Other portions of the system would be executed in response to the addition of new input data.

Figure 10:
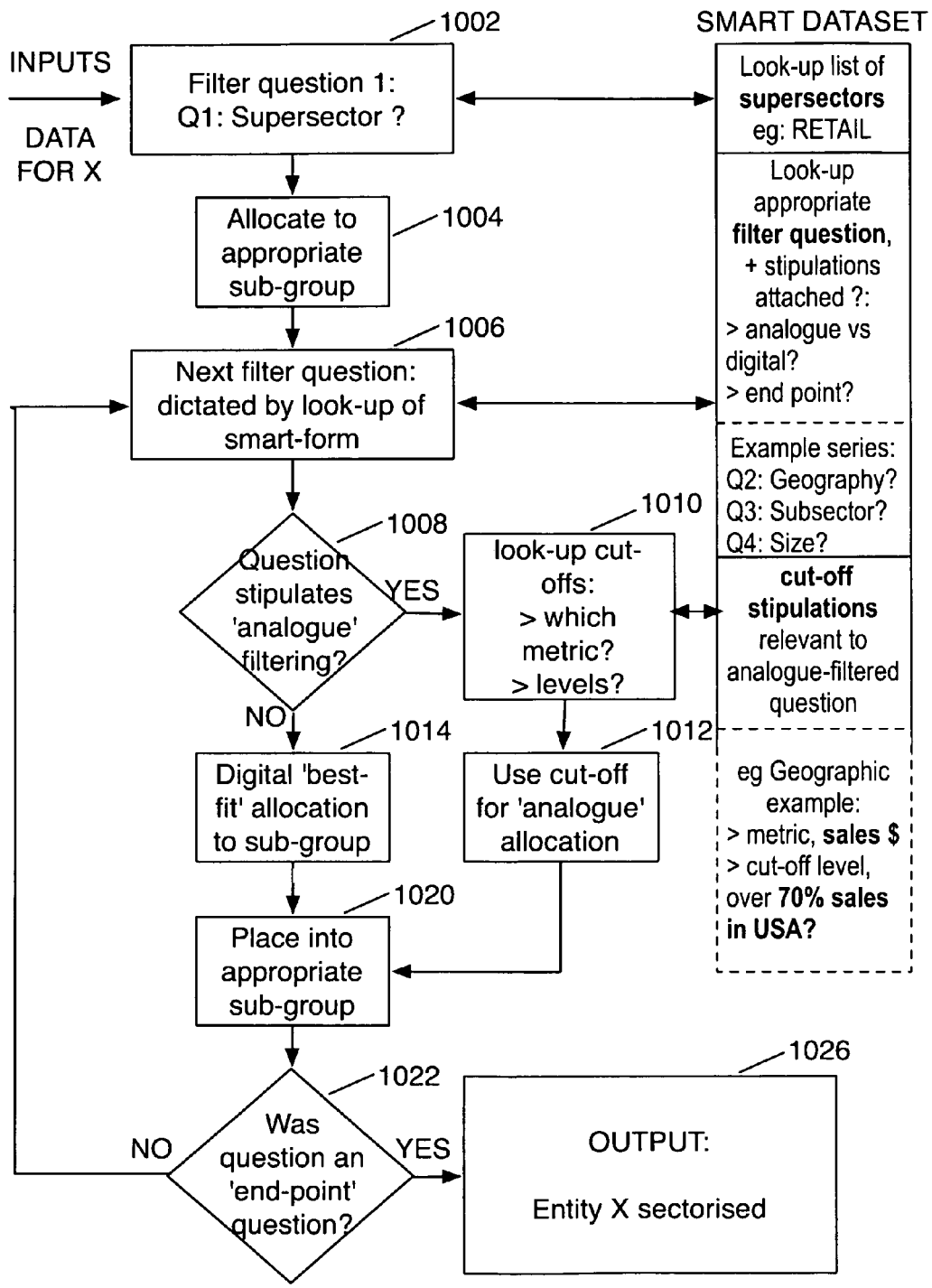
FIG. 10 is a flow chart showing details of a system module to perform sectorization.

Module 1 (Sectorization), shown in FIG. 10, performs the function of fitting a company into a particular, tightly-defined sector, based on several factors. This step is necessary such that entities being rated are compared against like entities to make the comparison meaningful. Therefore, it s desirable that the definition of sectors for purposes of this invention be well-defined.

Sectorization can be performed based on several factors, and the factors specified here are provided only as examples to illustrate the concept.

Super-Sector: The broadest factor used in sectorizing an entity is the super-sector, generally a broad industry descriptor, such as oil and gas, automotive or retail.

Geographical Scope—Where the entity does business. This factor may be dependent upon the super-sector that the entity falls into, for example, some super-sectors are by nature, global in scope, such as oil and gas, while others, such as retail, are more likely to be geographically limited in scope.

Sub-Sector Peer Group: This factor further refines the sector based on types of goods and or services, for example, a clothing retailer versus a grocery retailer, or a short-haul airline versus a long-haul airline.

Pricing Differential: This will differentiate entities based on the target consumer group, for example, a value supply house versus a supplier of luxury goods.

Size Differentiator: Differentiates based on size, such as a major retail chain versus an entity consisting of a single or few retail locations.

Because some factors may not be applicable to certain sectors, the actual factors used to define the sector of a particular entity are dependent upon the sector in which the entity will eventually reside. There may also be other factors not mentioned above which will be taken into consideration for various sectors. Module 1 (Sectorization) is envisioned to be implemented as a series of smart questions, wherein each succeeding question that is asked is dependent on the answers received from preceding questions, until enough information is obtained to correctly sectorize the entity. Entities will be asked a series of questions which will eventually lead to the placement of the entity into a tightly defined sector. The questions are envisioned to change based on a specific entity's progression through the questions. For example, if the entity is asked to select a supersector and combined oil and gas is selected as an industry sector, the question regarding the geographical scope of the business may not be asked because it may be assumed that all entities in the combined oil and gas sector are global in their geographical scope. It should be noted that geographical scope may relate to areas of production or to areas of purchase by end user of the company's products, or both. There may also be entities that fit into more than one tightly defined sector. For example, a retailer may sell both clothing and groceries. The sector into which the entity is placed may be determined by determining which percentage of overall sales come from a particular type of goods. For example, if 70% of the retailers sales come from clothing and 30% of the sales of the entity comes from other goods, such as groceries, it may make sense to place the entity into a sector with other clothing retailers. The exact cut-offs for these 'best-fit' placements into sectors may be determined on a sector-by-sector basis and translated into guidelines which may change over time in the light of new information and changes in business models.

It is also envisaged that some complex conglomerate companies who trade in a number of industry segments under the same brand name may be subject to a hybrid rating whereby certain business units which compete with other companies in the various sectors of the conglomerates operations are considered to behave as discrete business entities and are compared to the sector peers with which they compete, given a rating outcome value relative to those entities, several of which rating outcome values can then be combined in various methods to make the final rating for said conglomerate company. In one embodiment of the invention, the individual business units of a conglomerate may be treated as completely separate entities.

FIG. 10 shows the process of sectorization by 'smart form' as performed in Module 1 in FIG. 9. In box 1002 the entity is asked to identify the supersector to which it belongs. A look-up list of pre-defined supersectors may be provided. In box 1004 the entity is allocated to the appropriate subgroup based upon its answer to the supersector question in 1002. In 1006 the user may be asked one of more follow up questions, which may be supersector dependent. The follow-up question may contain additional stipulations that are dependent upon answers to previous follow-up questions. In box 1008 it is determined whether analog or digital filtering will be used to determine the next question. In box 1010 the analog cut off levels are retrieved and utilized to further refine the sectorization in box 1020. If the question does not utilize the analog filtering, process flows to box 1014 where a digital best fit allocation to a subgroup is performed. In box 1020 the entity is placed into the appropriate subgroup and it is determined in box 1022 if the question was an end point question, meaning that enough information has been gathered to completely sectorize the entity. If so, the entity is sectorized in box 1026. Otherwise, controllers return to box 1006 where an additional follow-up question may be asked.

Figure 11:
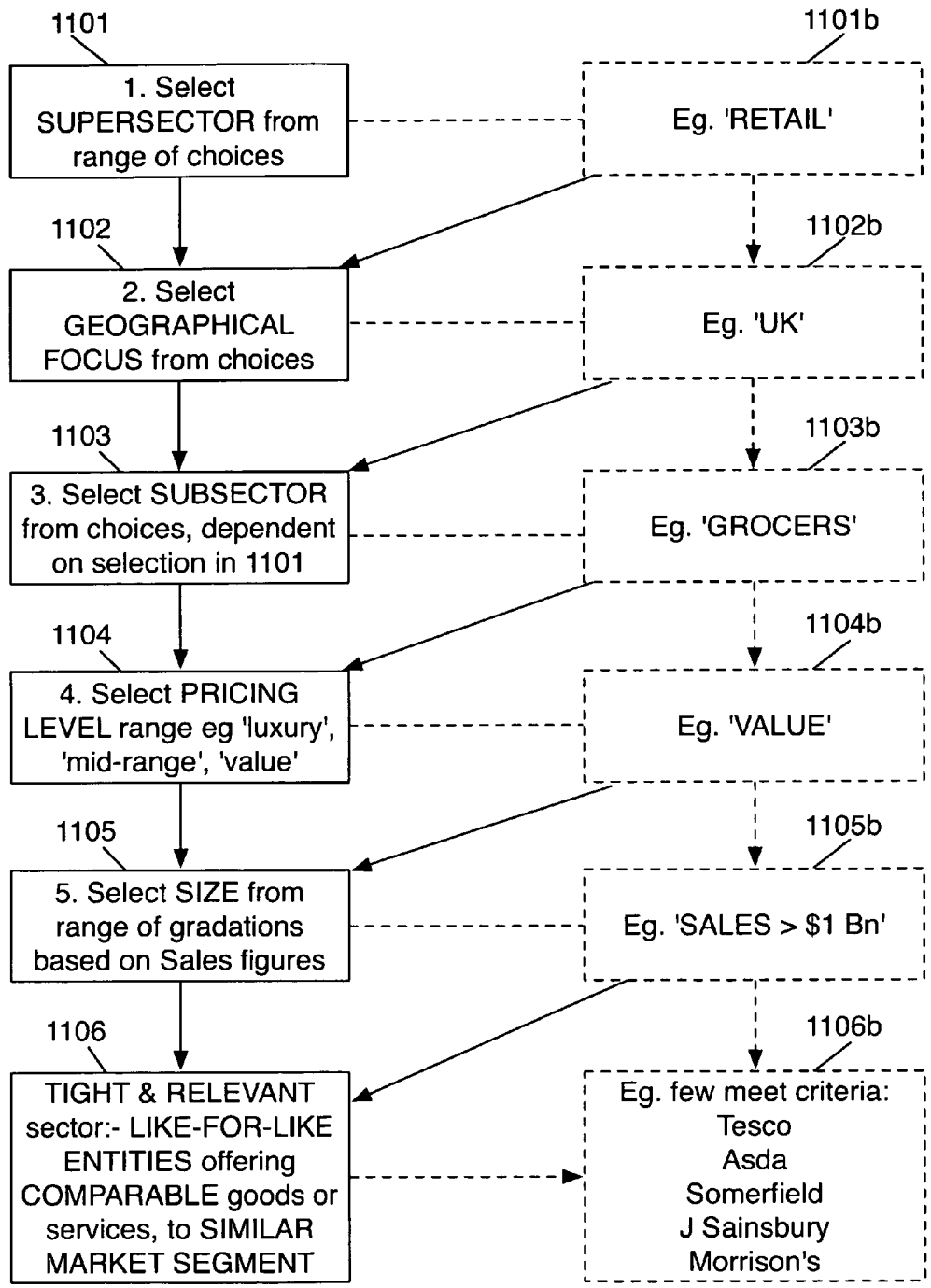
FIG. 11 shows a worked example of the system module in FIG. 10 for performing sectorization.

FIG. 11 shows a worked example in more detail of the sectorization as performed in Module 1 in FIG. 9. The left side of FIG. 11 shows various questions or categorizations that the system may ask the user to make regarding the entity being sectorized. In box 1101, the user will be asked to select a supersector into which the entity being sectorized falls. In this case, in box 1101a, the user has chosen "Retail" as the supersector. The supersector will be used in almost all cases to begin the flow of questions leading to a final, tightly defined sectorization.

In box 1102, the user is asked to select a geographical focus of the entity's operations and, in box 1102b, the user selects "U.K." as the geographical focus of operations. In many cases, where entities have wide geographical scope of operations, some criteria may be used to determine where the focus of that activity lies. For example, it may be determined that the focus of the entity's operations lies where the greatest percentage of sales are made or where the greatest percentage of products are shipped, etc.

In box 1103, the user is asked to select a sub-sector. This question of necessity includes input from the user selection made in box 1101a regarding the supersector, as some sub-sectors will be applicable to a selected supersector while other sub-sectors will not be applicable to the supersector selected in box 1101a. Therefore, in box 1103, the tailoring of the questions begins. In box 1103b, the user makes a selection of sub-sector, in this case, for example, "Grocer."

In box 1104, the user is asked to make a selection regarding the pricing level of the goods being sold. Possible answers to this question may be dependent upon the input from box 1103b. It can be seen that, in this case, in box 1004b the user has selected a "Value" range of pricing for goods. Other examples of answers to this question may be "Mid-Level" or "Luxury".

In box 1105, the user is asked to specify the size of the entity. In the case of retail, for example, this could be based upon the value of goods sold, while in other supersectors and sub-sectors size may be based on a different metric. The user makes a selection in box 1105b and, in box 1106, the entity is sectorized into a tightly defined sector based upon the answers to questions 1101-1105.

In box 1106b, the entity is added to the list of already existing members of the tightly defined sector. Note that at each stage, the entity's answer to the question specified in boxes 1101-1105, made in boxes 1101a-1105b, get fed back into the next round for use in selecting the next question (and possible answers to that question) to be asked to the user. The metrics used in boxes 1101-1105 may therefore vary based upon the answers made in boxes 110b-1105b.

It is the goal of Module 1 in FIG. 9 to produce a sectorization of an entity such that it is being rated against entities that are as close to the entity being rated as possible. The main consideration is to rate companies offering similar goods or services, however, other considerations, such as size and business models may be important—it may be unfair to rate, for example, a large multi-national grocery chain against a local grocery chain having only 2 or 3 stores.

Once the entity has been sectorized appropriately, it is next necessary to determine the total emissions figure to be used for comparison to its sector peers. The emissions for incorporation are Scope 1, 2 and subsets of Scope 3 emissions, as defined by those of skill in the art.

Scope 3 emissions used in the ratings process include measurable, indirect emissions. The relevant inclusions of Scope 3 emissions for a given sector in a given accounting period are calculated in Module 2 shown in FIG. 8. The Scope 3 emissions, as calculated for inclusion by Module 2, may include all indirect emissions and what may be termed "supply chain emissions". These include such things, for example, as the travel of an entity's employees to and from work and for business travel, the commuting of customers coming to a retail store, waste disposal, deliveries of raw materials and deliveries of finished goods, etc. These emissions are collected and calculated in Module 2 and then provided to Module 5 in FIG. 9 for use in calculating the net emissions figure for the entity.

With respect to Scope 3 emissions, there are several different types of emissions that may be taken into account (or ignored) based upon the particular model chosen to calculate the Greenstar rating. The decision regarding which Scope 3 emissions to include in the overall ratings of participating entities may be a function of the availability of data necessary to calculate the contribution of various types of Scope 3 emissions into the overall rating.

Upstream Scope 3 emissions would include goods, raw materials and services from upstream providers for which the entity may incur a $CO_2$ emissions responsibility. For example, providers of raw materials, such as company A in FIG. 12, will provide those raw materials to the entity being rated and will pass along a degree of responsibility for a portion of the $CO_2$ emissions necessary to gather and deliver those raw materials. Likewise, companies providing professional services to the entity being rated, such as Company B in FIG. 12, will also pass along a degree of responsibility for $CO_2$ emissions. This $CO_2$ responsibility, incurred by the entity being rated, increases the entity's carbon footprint and will affect the overall rating of the entity. There may be many methods for determining the percentage of the supplier's carbon footprint which gets passed to the entity being rated, but any method is contemplated to be within the scope of the invention.

Figure 12:
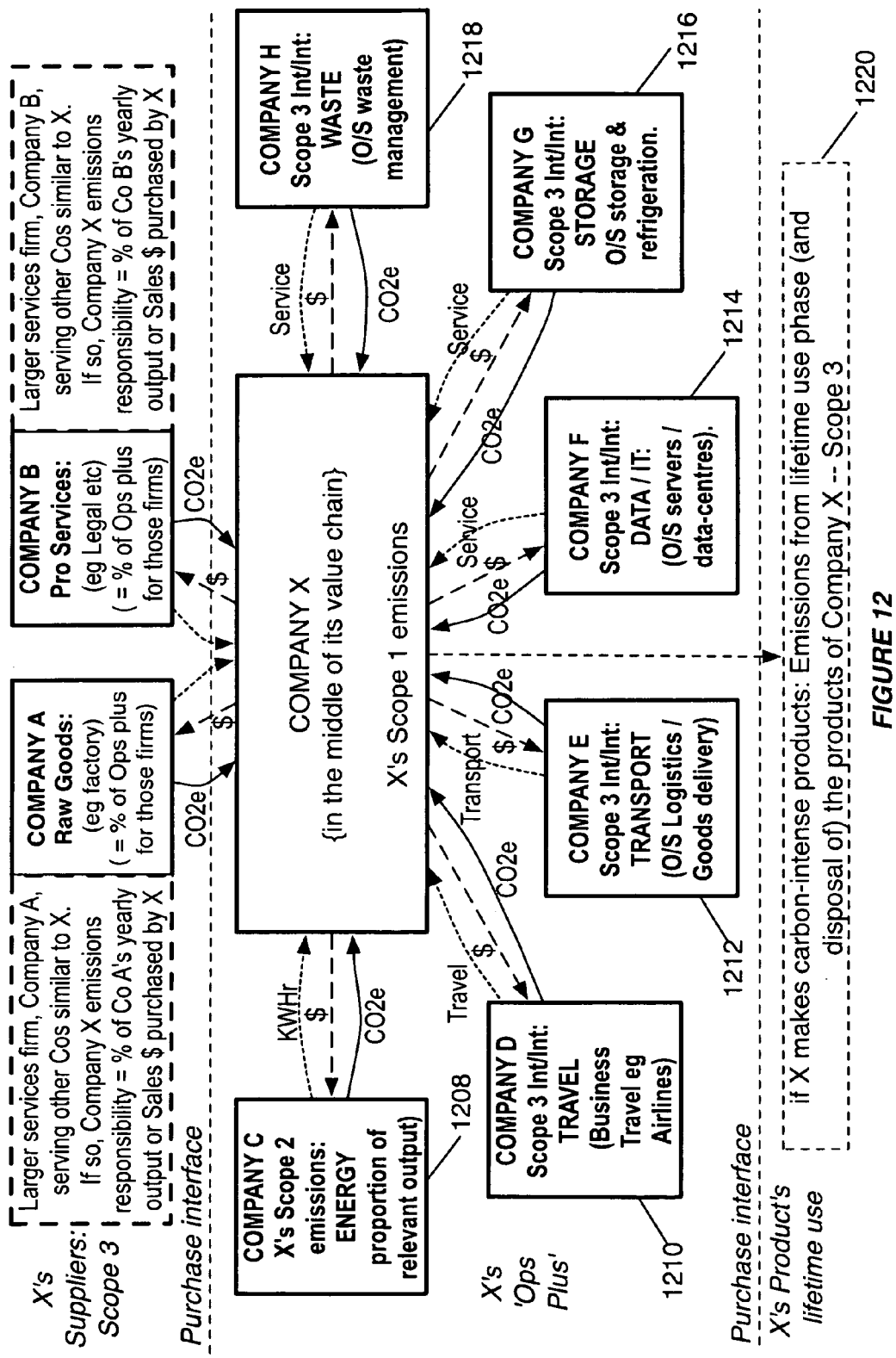
FIG. 12 shows details of a system to model indirect 'Scope 3' corporate emissions, including consideration of 'Integral/Intensive' emissions that fall within the Scope 3 category.

Specific methods for determining Scope 3 emissions which are most readily calculable have been identified and are shown in FIG. 12. These include consideration of the specific output by business units or facilities of the supplier which serve the company being rated, and optionally, consideration of proportional purchasing as a percentage of a supplier's total sales figure. The suppliers passing on some degree of $CO_2$ emissions responsibility may be the 'first degree' suppliers only (i.e. those with contracts directly with Company X) or they may be the suppliers to those suppliers, (i.e. the second or third degree suppliers to Company X), and so on. If the latter, there may be a diminishing responsibility curve applied, where, for instance, Company X is deemed to be responsible for a progressively lower percentage of the suppliers who are further from it in the supply chain.

Scope 3 emissions also include downstream services. Because of the likely difficulty of measuring the carbon responsibility incurred by the entity based upon Scope 3 activities, and to protect against outsourcing-bias—where one firm may perform a carbon-intense part of the value chain in-house while a competing firm may outsource that activity, and so skew the ratings—a number of activities have been identified which may be easily quantified and should ideally be considered. These particular activities have been termed "integral/intensive" ("int/int") activities. To be an int/int activity, the activity must meet the following criteria. First, it must be integral to the company's business. For example, the downstream transportation of goods manufactured by the entity. Secondly, the activity must be relatively carbon intense. Thirdly, the activity is generally performed on the entity's own goods or services. For example, the transportation of the company's goods or services to market or the storage and refrigeration of goods and services prior to reaching market. Lastly, the int/int activities must be those that are frequently out-sourced by comparable entities or performed in-house by comparable entities. All int/int downstream activities are those for which the entity in question receives a service which carries with it a $CO_2$ emissions responsibility for the purposes of Greenstar ratings.

Greenstar has identified several areas of int/int downstream activities which it believes are easily quantifiable and maybe used in the final calculation of an entity's greenhouse gas emissions responsibility, and the relationship between these and the company being rated is shown in FIG. 12. These int/int Scope 3 emissions include emissions from the following sources:

1. Business Travel (1210 in FIG. 12);
2. Outsourced transportation of goods and services (for example) from a manufacturing facility to the entities own stores) (1212);
3. Outsourced data center and services (1214)
4. Outsourced goods storage and refrigeration of goods (1216); and
5. Outsourced waste management (1218).

There may be other int/int type emissions which are sector specific or which have not been identified, and, as such, the above list is not meant to be exhaustive. Note that the int/int downstream activities are activities which, if performed by the entity being rated, would be considered Scope 1 emissions, but, because they are being outsourced, are considered Scope 3 downstream emissions. As a result, because many entities in a particular sector may either perform these activities internally or outsource them, it is thought that, by including these activities as Scope 3 emissions, they will be more fairly equalized with entities that perform these activities internally. This avoids giving an undue advantage to those entities that outsource these activities.

The sum of Scope 1 emissions, Scope 2 emissions (those from energy consumption, shown as 1208 in FIG. 12) and the int/int Scope 3 emissions may be collectively referred to as "Ops-plus" emissions. The Ops-plus emissions can be sector specific and based upon sector specific int/int activities, which may vary from sector to sector. Note that int/int activities within a particular sector can be calculated on a time basis as long as each entity in a particular sector is treated the same for any given accounting period.

Scope 3 downstream emissions responsibilities may also include emissions incurred through the use of the entity's finished goods over the lifetime of those goods, shown as 1220 in FIG. 12. For example, entities producing cars, planes or electrical goods can be considered to incur an additional $CO_2$ emissions responsibility for the use of those goods over their lifetimes. Therefore, the entities have an incentive to create goods which are as efficient as possible to keep from increasing their $CO_2$ emissions responsibility. Note that it is unlikely that verifiable data will be available for these types of Scope 3 emissions for some time and as such, the inclusion of these in an overall rating may be introduced over a period of time. As such, their inclusion in the ratings are optional.

When introduced in due course, the emissions responsibility from the end user's use of the entity's goods may be incorporated at the level of Module 2, by incorporation as an additional numeric metric tons of $CO_2$ value, or may optionally be incorporated using the method detailed in Module 10 of FIG. 21, described below.

Module 3 (Offset Quality Discount Rates) in FIG. 8 calculates credits for any offsets purchased by the entity. The credits may be discounted based on a discounting system which takes into consideration, among other factors, the quality of the offsets being purchased, and the 'delivery-risk' of forward-purchased emissions credits. The discount rate which is applied to offsets purchased will account for lower quality or higher quality of the offsets by discounting those offsets of lower quality. Likewise the discount rate will further discount those advance-purchased credits with the highest risk ratio.

The United Nations Clean Development Mechanism (CDM) is a standard for offsets which has been adopted by the Kyoto protocol. At the time of filing, it is taken to be the definitive standard for offsets, in terms of the rigor of its guidelines and the extent to which those guidelines are enforced. Offset regulations are subject to change and there may be new standards introduced which are better or more rigorous, and may become the new defining standard over time. Therefore the current ratings, as per the model defined herein, are not intended to be limited to any specific named standard, but rather emphasizes the principle of having a defining standard to which others are compared.

Figure 13:
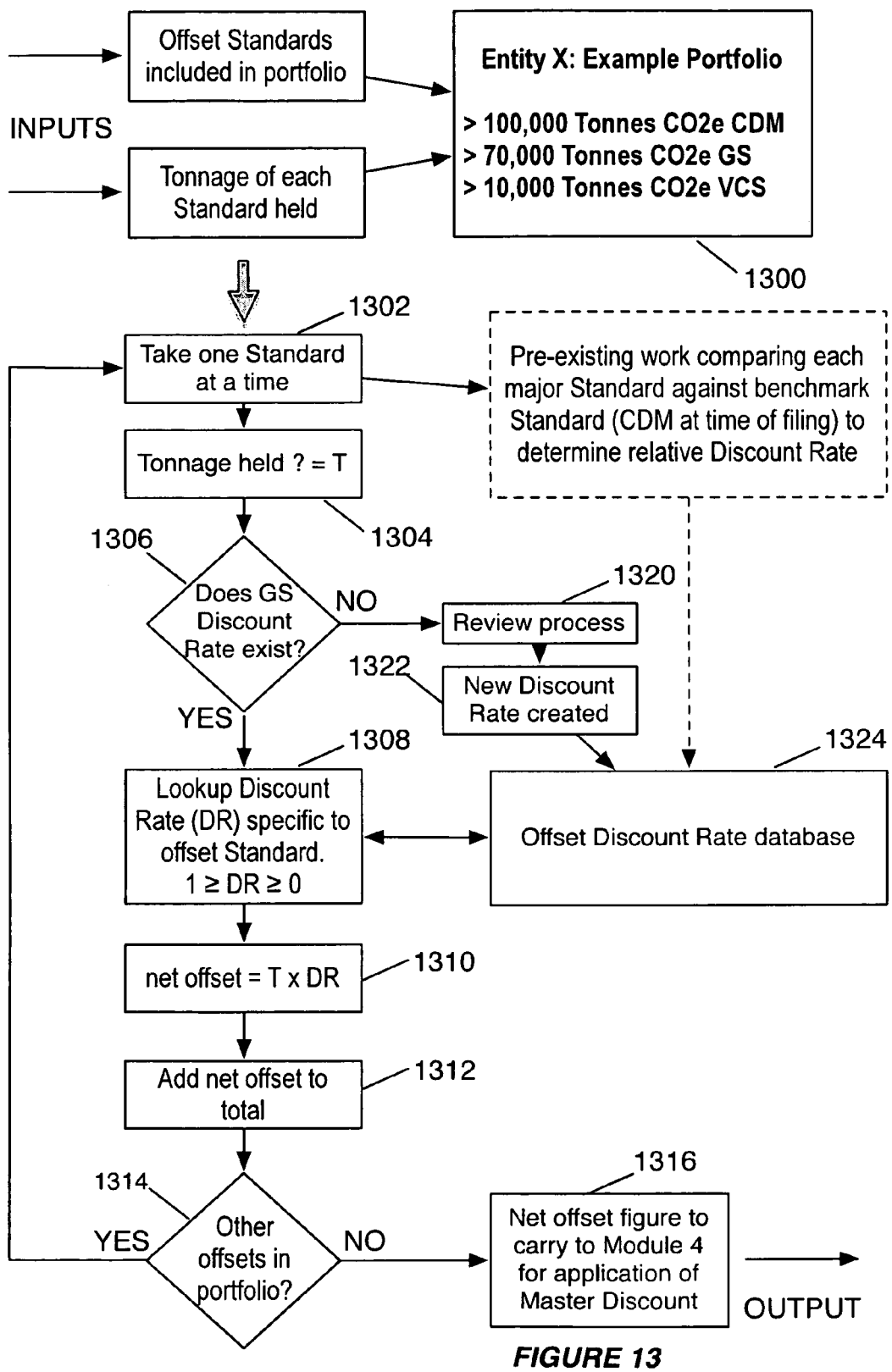
FIG. 13 shows details of a system module to perform the calculation of the Offset Discount Rate relating to offset quality.

As shown as a detailed system module in FIG. 13, carbon offsets purchased by an entity are compared to the CDM model and are awarded points based on their percentage similarity to the CDM. Therefore, another offset standard with comparable rigor to the CDM would also receive a standard discount rate of 1 (i.e., no discount) while a lesser quality offset may receive a offset discount rate which is a percentage of 1. For example a credit which is in 75% compliance with the CDM will be discounted by 25%. Offset Module 3 will calculate a blended overall quality discount rate based upon the mixture of offsets purchased and their particular ratings against the CDM standard.

The process shown in FIG. 13 is run against the company's portfolio of CO2 offsets 1300. In box 1302, one type of offset is examined and in box 1304 it is determined what the metric tonnage of offsets of that particular type are held by the entity. In box 1306, the module checks to see if a discount rate already exists for that particular type of offset and, if it does exist, the discount will be looked up from database 1324 in box 1308. In box 1310, the discounted net offset will be calculated as a percentage of the total metric tonnage of that particular type of offset held by the company and, in box 1312, the net offset is added to the total offsets. In box 1314 it is determined if there are other offsets in the portfolio which must be taking into account and, if so, control is returned to box 1302, where the next offset is evaluated. If no other offsets remain in the portfolio the net offset figure which is utilized as an input through the process shown in Module 4 is produced in box 1316. If database 1324 does not currently have a discount rate for a particular type of offset, a review process will be conducted in box 1320 and a new discount rate created in box 1322, which is then stored in offset discount rate database 1324.

In addition to the discount rate based on quality of offset, there may be a Master Discount Rate (MDR) applied, in addition to the previous discounting. The MDR is calculated in Module 4 (Offset MDR) in FIG. 9, and may be based on a number of different factors, using a number of different methodologies, as detailed below. The intention of the MDR is to encourage companies to reduce their actual greenhouse gas emissions first, before resorting to the purchase of offsets. Without a master discount rate system, the risk that companies will purchase offsets rather than investing in actual $CO_2$ emissions reductions is high because, in general, it is less expensive to purchase a metric ton of offsets than it is to make the investment in the energy efficiency of one's facilities or renewable energy sources necessary to engender reduction of a metric ton of emissions. Furthermore, there are doubts among many of those of skill in the art that the creation of a metric ton of offset $CO_2$ is as beneficial to the climate as cutting actual emissions, because other unquantifiable factors need to be taken into account, for example, the continuing capacity of the offset project to reduce emissions in future years and concerns over 'additionality'—the requirement that the emissions reduction would not have happened anyway without the investment of the offset project.

In its simplest form, the MDR may be a fixed discount rate, such as 50%, to be applied to all offsets, regardless of quality. In an alternative embodiment, the MDR may be a sector-specific constant, to take into account the differences in cost of investing in technologies to reduce an entity's actual carbon footprint versus the cost of purchasing offsets. These differences may vary between given sectors because the cost of reducing the actual carbon footprint may be dependent on previous investments in emissions reductions as well as the specific average abatement costs of typical facilities for entities in a given sector. For example, in the oil and gas industry, the average for costs industry wide for reducing emissions may be $100 a metric ton, but the going rate for offsets may be only $25 a metric ton. In such a case, the master discount rate may be set at 25% and all offsets purchased would be discounted to that amount. In another sector, for example, in which the average cost of abatement is lower, say $50 per metric ton, the master discount rate may consequently be 50%, relative to the same average figure for cost of offsets of $25.

In yet another embodiment, the MDR calculation may utilize an "improvement velocity metric". Reducing an entity's actual carbon footprint becomes more expensive with each percent of reduction achieved. This is because the 'low hanging fruit' emissions—those that are due to sources that are relatively easily and cheaply remedied—tend to be addressed first. Therefore it would be desirable to have a system that rewards entities for having made the initial investments in actual reduction relative to those that have not. The improvement velocity metric is a measure of how an entity has performed over time in terms of controlling or reducing its emissions, versus its own internal normalizers or versus other entities in its sector. The improvement velocity metric accounts for the speed at which a company improves over time and can be used to adjust or replace the MDR which is applied to the offsets. Note that this calculation of the MDR would likely be applied to individual entities within a sector, and not sector-wide. Therefore, different entities within the sector may have different MDRs. In such a case, an improvement velocity metric could optionally be used to reward companies who improve very quickly by making the MDR based on the improvement velocity metric greater than 100%, which would actually increase the impact of the offsets purchased by the entity on the overall rating.

The improvement velocity metric may be measured over a long period of time, to avoid penalizing a company that has a very high improvement velocity metric one year and then a low improvement velocity metric the next year. Note that, in many sectors, the data availability, both in terms of the existence and the standardization of data, required to calculate a robust improvement velocity metric may not be sufficient at the time of filing of this application. However, the available data is becoming increasingly more complete as companies and other organizations increase their internal data-gathering activities to stay compliant with governmental regulations and public-reporting guidelines. It is anticipated that the improvement velocity metric will be incorporated in future executions of the ratings system.

Figure 14:
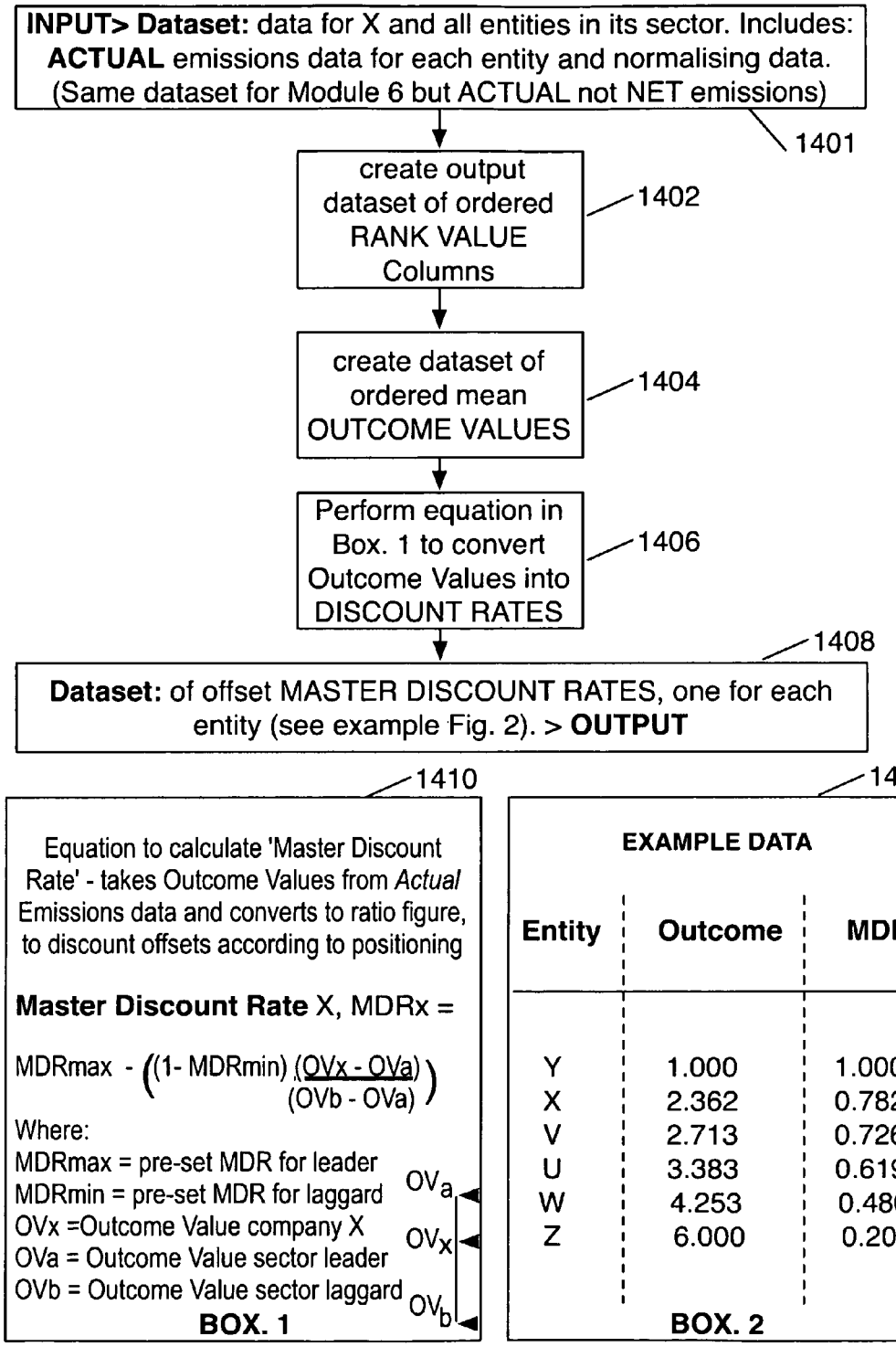
FIG. 14 shows details of a system module to perform the calculation of the Master Discount Rate (MDR) for offsets, to be applied to all offsets in the entity's portfolio, regardless of quality.

In yet another embodiment, shown as a detailed system module in FIG. 14, the MDR may be calculated based on actual emissions of the entity to be rated against other entities in its sector. For such a calculation, it is likely that only Scope 1 and Scope 2, or possibly, Ops-plus emissions will be taken in to account. This provides a proxy measure for those entities who have already made reductions by investing in efficiency measures to address the 'low hanging fruit' emissions. In this embodiment, the entities leading their field on actual emissions performance would get the most favorable MDR and hence, the highest reward from the offsets purchased. If the entities who lag behind the leaders on the actual emissions catch or overtake their competitors by having addressed their own 'low-hanging-fruit' emissions, they will be eligible for the more favorable discount rates for offsets.

FIG. 14 shows the process by which the MDR for offsets is calculated. The input data for this process is shown in box 1401 and includes information regarding the actual emissions of the entities as well as the normalizing data. It is contemplated that only the actual emissions, that is Scope 1, Scope 2 and possibly int/int emissions of the company will be used to calculate the intensity metric rankings. The normalizing data will be dependent upon the intensity metrics which are selected for use with the particular sector, and may include, for example, such things as sales dollars, number of employees, etc. In box 1402, a ranking of the entities within the sector for each intensity metric is calculated, and, in box 1404, the calculation is performed to derive an outcome value for each entity in the sector, based upon each entity's ranking within each of the intensity metrics. The intensity measures may be weighted. In box 1406, the outcome values are converted into an MDR for offsets according the equations shown in box

1410, in FIG. 13. The output in 1408 is a listing of each entity in the sector and its MDR as shown in box 1412.

In another aspect the MDR calculated in FIG. 14 may not be fully 'fluid' over time, but rather have an attainable fixed level to allow the laggard firms in the sector, as measured by the determination of relative positioning according to actual emissions, to attain the same MDR as the leaders once they also reach a certain 'floor' level of actual emissions intensities. The floor level may be set at the emissions intensities of the leaders in the first year of operation of the Greenstar system. This optional 'floor level' method may be used to prevent the risk of 'double dis-incentivisation' in certain sectors—a situation whereby laggard firms find it is more expensive than they can afford to lower their actual carbon emissions, and because they are behind the leaders on actual emissions, also find their offset investments heavily discounted in successive years by the MDR module. Therefore they may feel that despite buying offsets they will never catch the leaders, and so leave the system, failing to make emissions improvements.

In a final embodiment, the MDR may not be explicitly calculated, but would be implicitly taken into account as the entities are ranked in Module 7, discussed below. In such an embodiment, Module 4 may not be required.

Once the overall quality offset figure is calculated in Module 3 and modulated by the MDR calculated in Module 4, the net emissions figure can be calculated in Module 5 in FIG. 9. The net emissions figure is then sent to Module 6, where the net emissions figures are normalized across the sector.

Figure 15:
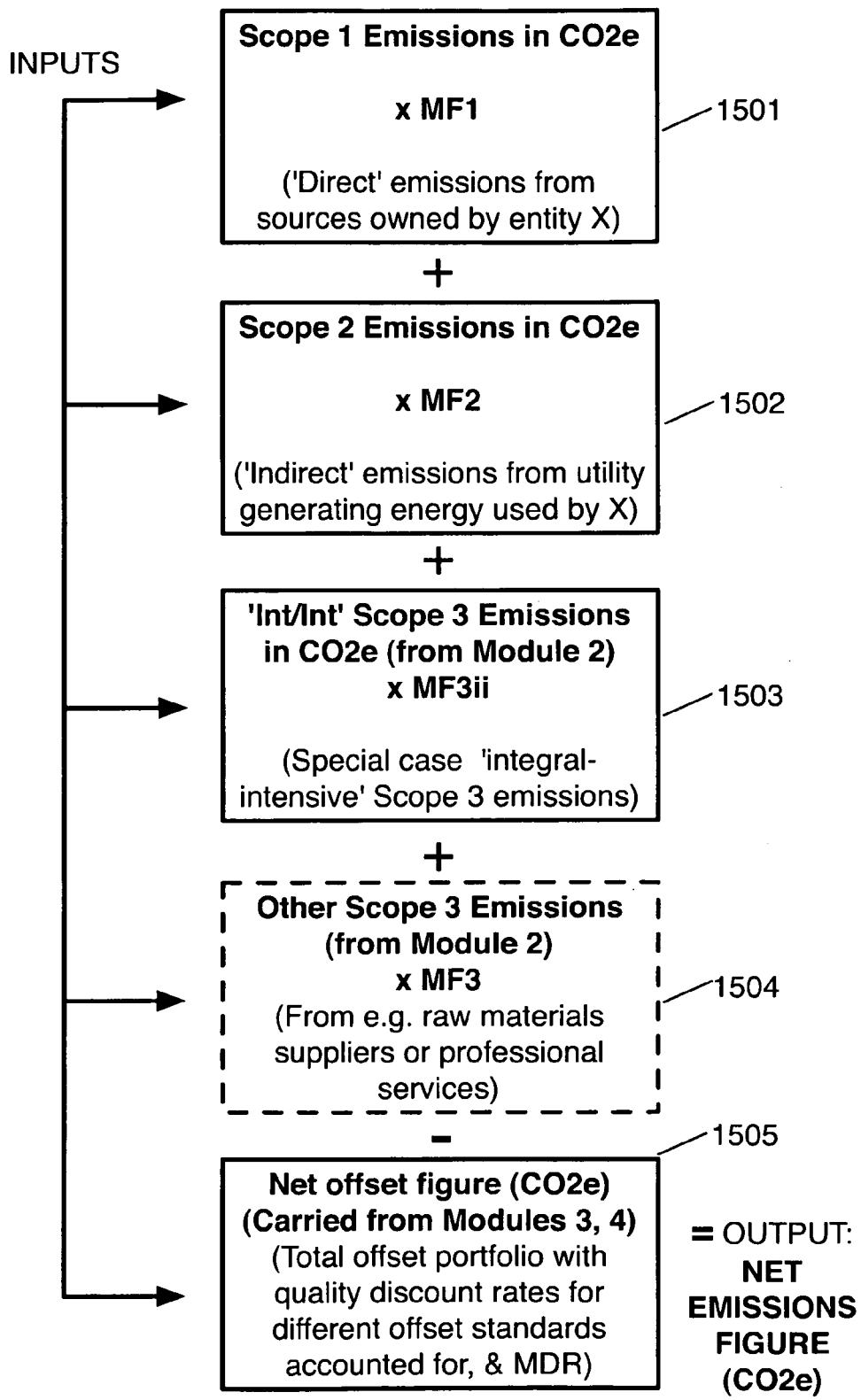
FIG. 15 shows details of a system module to perform the calculation that takes all the emissions data to be incorporated and outputs the value for each entity's net emissions, to be used for comparison to the rest of its sector.

Module 5 (Net Emissions) in FIG. 9 is shown as a detailed system module in FIG. 15 and performs the function of calculating the net emissions of a particular entity by adding Scope 1 1501, Scope 2 1502, the int/int Scope 3 emissions 1503, and other Scope 3 emissions 1504. Optionally, each of Scope 1, Scope 2 or Scope 3 may be multiplied by a modification factor (MF) to take account of any business model differences which disadvantages one particular entity versus the others in its sector. For instance, in grocery retailing, a great deal of corporate emissions come from refrigeration, as it is energy intensive. Therefore one retailer might be compared with another in the same sector, but one who uses much more refrigeration because of slightly different business model/market segment targeted. Therefore, Supermarket A, who must refrigerate 80% of its products might be compared with Supermarket B, who refrigerates only 40%, yet is still in the same sector for analysis, for which 50% is average refrigeration level. All other things being equal, Supermarket A would have far higher greenhouse gas emissions, and this may be seen as unfair, relative to Supermarket B and peers. With twice as much refrigeration, Supermarket A may be known to have, say, a quarter more emissions from Scope 2. Therefore using known significant biasing affects of a particular factor to a particular sector, such as refrigeration, it is possible to calculate a modification factor. In this scenario, it may be that the Scope 2 emissions figure for Supermarket A is multiplied by a modification discount factor, of 0.75 to take account of the bias versus the sector average, and redress it. The modification factors may be multiple, addressing several known affecting factors, and may be applied to one or all of the scopes for analysis. The Modification Factors are shown as MF1, MF2, MF3 in FIG. 15. (In the default situation, that is, no known bias from business models, the MF value for each Scope would simply be 1). Lastly, the net credits for offsets which have been purchased by the entity, after discounting 1505, are then subtracted from the final net emissions figure.

Module 6 (Normalizing) provides the normalization of the net emissions figure to take into account size and activity over the year of the various entities within the sector, such that meaningful comparisons can be made between those entities. The normalization is based on carbon intensity measures—defined as the amount of metric tons of $CO_2$ emitted per a particular metric. The particular metric may be, for example, metric tons of $CO_2$ per employee, metric tons of $CO_2$ per thousands of dollars of sales, metric tons of $CO_2$ per 'value-add' (meaning sales minus expenditure on suppliers), metric tons of $CO_2$ per square foot, metric tons of $CO_2$ per Unit Output etc. The metrics chosen may differ from sector to sector but will be constant across any given sector. Examples of Per-Unit Output normalizing measures can be diverse and may include, for example, RPK (revenue-passenger-kilometers) for airlines or other transport companies, Kilowatt-hours supplied for energy companies, metric tons of gold for commodity companies, and number of active bank accounts for lending banks. It is desirable that such unit measures are as comparable and fungible as possible to optimize comparability.

The net emissions figure may be normalized by more than one factor. For example, metric tons of emissions per employee and metric tons of emissions per square footage. Module 6 will essentially create an intensity ratio for each of the normalizing measures to be used for the sector. The entities within a sector are then measured against each other for each of the chosen metrics. The final rating of the company is calculated as the average of the rankings for each of the normalized metrics as shown in Module 7 in FIG. 9, shown as a detailed system module in FIG. 18.

Figure 16:
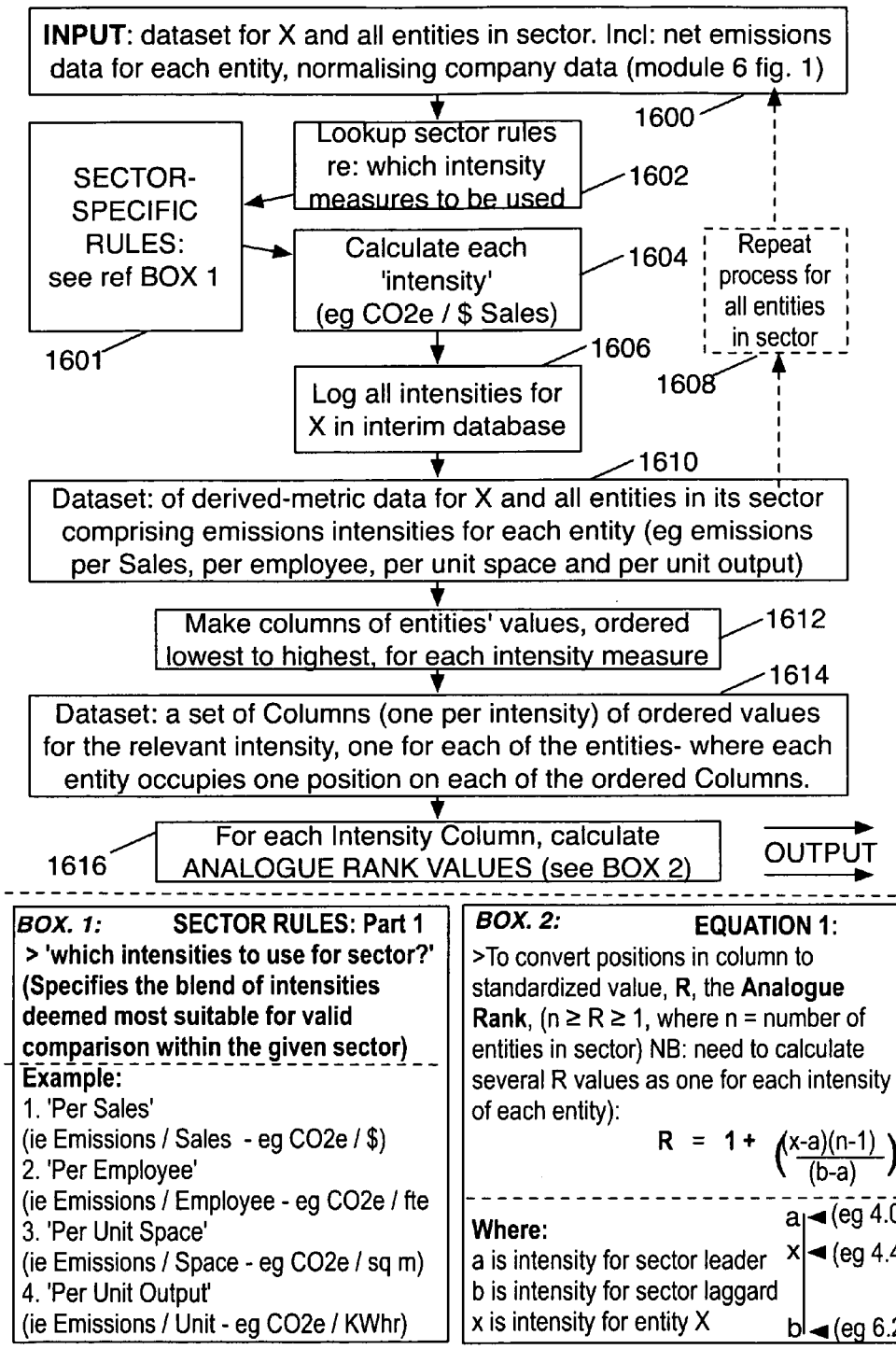
FIG. 16 shows details of a system module for performing the first part of the normalizing process, which is the creation of "columns" of emissions intensity values, and ordering them by entity.

In Module 6 all of the following steps occur:
 i. the creation of the relevant intensity metrics
 ii. their ranking in ordered columns
 iii. the conversion of the ranking into a rank value, R, for each entity in each intensity The above steps are shown in flow diagram form in FIG. 16, and examples of the resultant datasets are shown in the first two of the three tables in FIG. 17.

In one embodiment of the ranking process the R value assigned is simply a 'digital' rank, that is, an integer value denoting the position of the entity in the ordered column for the given intensity metric. For instance, if entity X was positioned $3^{rd}$ in the column for metric tons of $CO_2$ per sales intensity it would get the digital rank value of 3. Naturally, in this embodiment the R values would range from 1 (for the highest-placed entity), to n (for the sector laggard), where n is the number of entities in the sector.

In an alternative embodiment of the ranking process, the R value calculated is an 'analog' rank value—that is, a fractional number between 1 and n representing exactly the position of each entity's intensity value on the linear sector spread for that intensity, relative to positions of 1, the sector leader, and n, the sector laggard. There is an equation to readily calculate this figure for the analogue rank, shown in FIG. 16. Essentially it calculates the numeric value of the sector spread from leader to laggard, determines how far (in percentage terms) down that spread entity X, for example, lies, and converts that same percentage to a number somewhere between 1 and n. Naturally, if X is the sector leader, or laggard, the analogue rank would still be 1 or n respectively. A set of example datasets for analogue ranks is shown in the third of the tables in FIG. 17, being the analogue ranks resulting from the application of the analogue rank equation to the intensity figures in the first two tables of FIG. 17.

FIG. 16 shows the detailed process for creating the normalization figures for Module 6. The process starts with the data for all entities in a particular sector, which will include net emissions as well as data about the entity necessary to perform the normalization step. The data necessary to perform the normalization step would be dependent upon the specific intensity metrics which are used in the particular sector. For example, sales figures, numbers of employees, square meters of space, etc.

In box 1602 the sector specific rules, which include the intensity metrics to be used for the sector are looked up from database 1601. In box 1604 the intensities for each of the intensity metrics are calculated for a particular entity and in box 1606 the intensity measures for that entity are logged in to an interim database. In box 1608, the process is repeated for all entities in the sector, which results in a dataset consisting of the intensity measures for each entity in the sector in box 1610. In box 1610, the data is ordered as shown in table 1701 in FIG. 17, showing the intensity for each metric for each entity in the sector. In box 1612, the data is rearranged in an order that ranks each entity in the sector for each intensity metric, as shown in table 1702 in FIG. 17. In box 1616, for each intensity metric, the analog rank values for each entity is calculated, resulting in the table similar to the one shown as 1703 in FIG. 17.

In an alternative embodiment, which may be applied to certain sectors deemed to have made insufficient effort across the board, and to protect against the risks of a 'carbon-cartel' developing—i.e. a conceivable situation in which several sector competitors agree together to make little effort to improve over time, but still be rewarded with stars—it may be considered that the actual real-life sector leader does not actually deserve to receive an R value of 1, but rather that there be a simulated sector leader or "green superstar company" used for analysis, with benchmarked intensity measures of a level deemed to represent what the sector leader should be achieving. The concept of a simulated sector-leader may apply at any stage of the algorithm, and if applied in the final step of star allocation, may lead to no company being awarded the top level final rating, such as a three star outcome. For purposes of calculations, the simulated sector leader would be treated as any other entity in the sector.

Likewise, if a whole sector is considered to have performed exceptionally well and all players made great effort to reduce their carbon footprints, a simulated sector laggard, or "ostrich" company may optionally be used in calculations, whose metrics are used in comparison though the company itself does not exist. Similarly, if such a simulated ostrich company or companies were used in the final star assignment module, a higher number of the real companies in the sector may receive favorable ratings.

Note that the green superstar and ostrich virtual companies could also be used in sparsely-populated sectors, such that meaningful comparisons between few participants in a sector could be achieved.

The intensity metrics may also be weighted against each other in terms of their importance with respect to each sector. For instance, one metric may have a greater significance in, or greater relevance to, one sector than a different sector and therefore may be weighted higher for that particular sector. For each metric, entities within the sector are ranked with respect to each other based on the rank value for that metric. This is done for each metric.

The system module for weighting the R values for each entity for each intensity is Module 7 of FIG. 9. The module is shown in detail in FIG. 18. In Module 7, the metrics are then assigned percentages of the total ranking to create a weighted average overall ranking, referred to as the 'outcome value'. The overall ranking matrix may be visualized as 100 "columns" with each column representing an ordered list of the rank values, R, for each particular intensity metric, with the rank values for each entity ordered accordingly.

Referring back to tables 1703 in FIG. 17, which shows several such "columns", based on four possible intensity metrics for an example sector, the sector analog ranking value, R, of each of the entities from U to Z, for each intensity, are shown. Note that these rankings are based on the net emissions calculated in Module 5. Once a column has been created for each metric of interest with the R values in place, the columns (metrics) are assigned weights in Module 7. For example, 50 of the 100 columns may be assigned based on the Per-sales intensity metric column, 20 of the columns may be assigned based on the Per-employee intensity metric, 20 columns may be assigned based on the Per-Unit Space intensity metric and 10 columns may be assigned based on the Per-Unit Output intensity metric. As such, the four metrics receive weightings in the overall ranking of 50%, 20%, 20% and 10% respectively. The relative weightings applied will vary from sector to sector to take account of the different relevance of a given intensity metric to a given sector. To calculate the overall ranking, an entity's ranking within each column is added together, and the total is divided by 100, as per the equation in FIG. 18, box 2.

As an example, for the embodiment using digital rank values for R, and in a sector having three relevant intensity columns, an entity ranking R number 1 in 75 of the columns, R number 2 in 15 of the columns and R number 3 in 10 of the columns would have an Outcome Value of 1.35. Meanwhile, an entity ranking R number 2 in 75 of the columns, R number 1 in 15 of the columns and R number 3 in 10 of the columns would have an Outcome Value of 1.95 (a lower ranking). Obviously, an entity ranking number 1 in all 100 columns would have an overall ranking of 1.

As a similar example, but for the alternative embodiment using analogue rank values for R, an entity ranking number 3.762 in 75 of the columns, number 2.306 in 15 of the columns and number 1.949 in 10 of the columns would have an overall score of:

$$((3.762 \times 75)+(2.306 \times 15)+(1.949 \times \times 10))/100=3.362.$$

Meanwhile an entity ranking R number 4.577 in 75 of the columns, R number 2.105 in 15 of the columns and R number 2.979 in 10 of the columns would have an overall Outcome Value of:

$$((4.577 \times 75)+(2.105 \times 15)+(2.979 \times 10))/100=4.046$$
(giving a lower ranking).

Figure 18:
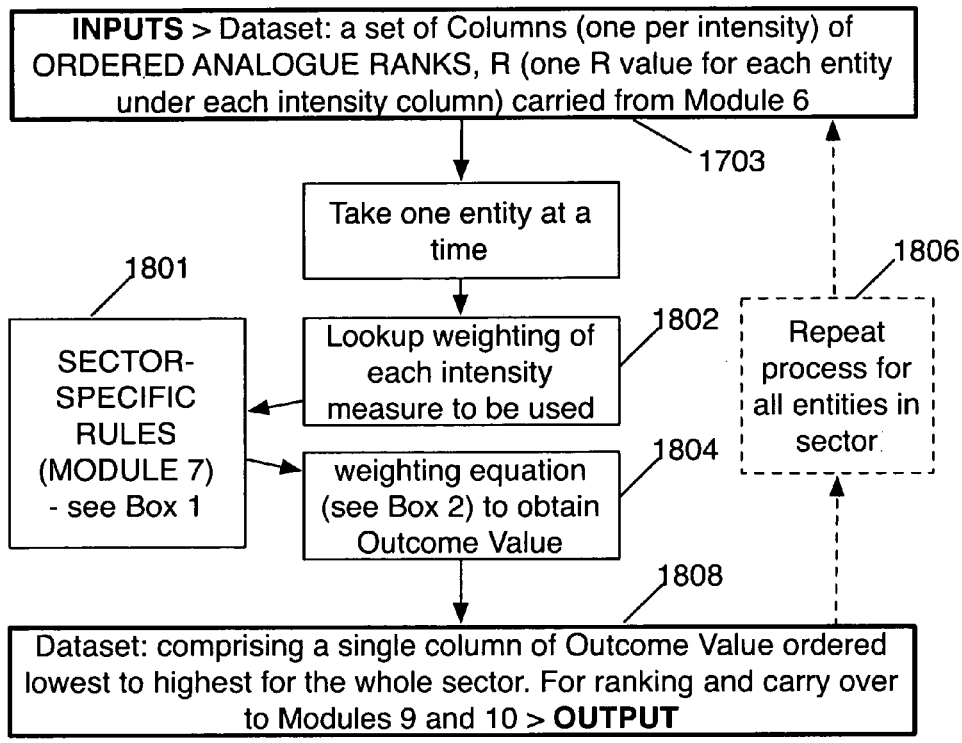
FIG. 18 shows details of a system module to perform the second part of the normalizing process, which is the creation of Outcome Values as averages of the rankings, weighted to various degrees.

Module 7, shown in FIG. 18, starts with the data table 1703 shown in FIG. 17 which includes the ranking of each entity in the sector for each intensity metric. The outcome value for entities are calculated one at a time. In box 1802 the algorithm looks up the weighting of each of the intensity metrics which are to be used in the analysis. The rating is stored in sector specific rules database 1801 which specifies the intensity metrics important for this sector and their ratings. In box 1804 the outcome value is calculated by applying the normalizing equation in box 2 of FIG. 18. The process is repeated for all end users of the sector in box 1806. The final outcome of the process is a ranking of outcome values for each entity in the sector, which is compiled in box 1808. The outcome value is used for determining the number of rankings indicia to be assigned to a particular entity.

In an alternative embodiment, in Module 6, using either analogue or digital ranking embodiments, it is possible to nuance the calculation by utilizing only a portion of the net emission figures to calculate the intensity for a particular metric. For example, instead of using the net emissions figure (i.e. after deduction of the offsets) another metric could be just Scope 1 or Ops-plus emissions divided by each of the normalizing metrics to give one measure of the direct carbon intensity. Because incorporating these intensity metrics based on actual emissions into the rankings would have the effect of additionally discounting the impact of offsets commensurate with the weighting given to the actual emissions, the weighting selected for each metric as well as the emissions included in the calculation of the carbon intensity for each metric may have the effect of implicitly including an MDR for the calculations, as mentioned above.

In an alternative embodiment, performing the same essential steps as Modules 6 and 7 combined, a slightly variant approach may be used that works as follows, and is included within the scope of the invention. Instead of creating, then ranking, the emissions intensities individually as described previously, all of the 'normalizing metrics', such as sales figure, are combined into a single figure, a 'global normalizing metric' (GNM) representing an aggregate of those normalizing metrics to be used. The global normalizing metric would essentially be one number representing the size of the entity. Each normalizing metric to be used to make the GNM may be weighted according to its relative importance or relevance, in a similar way to Module 7, and totaled. For example, a GNM could be calculated incorporating sales figure data, employee number data, and square footage of space by expressing each piece of data as a fractional score relative to the largest entity in the sector, where the largest is awarded, say 100, for each normalizing metric used. Therefore, in a sector where the largest sales figure was $1 billion dollars, and the lowest was $140 million, the company with largest sales would get a score of 100, and the one with the lowest sales, 14. Likewise this would be done for each of employee numbers and square footage, and then each would be weighted accordingly before combining into one number. For instance, if the weightings for each normalizing metric were to be chosen as Sales: 50%, Employee number: 20%, Space: 30%, the global normalizing metric for each would be as follows. The largest company in the sector (with e.g. sales of $1B, 100000 employees, and 10 billion sq foot of space) may get a GNM of 10000, calculated as=(100×50)+(100×20)+(100×30). A middle-sized company (with sales of $400 million, 30,000 employees, and 3.5 billion sq foot of space) may get GNM of 3650, calculated as=(40×50)+(30×20)+(35×30). Meanwhile the smallest company in the sector (with sales of $140 million, 8,000 employees, and 1.1 billion sq foot of space) would get GNM of 1190, calculated as=(14×50)+(8×20)+(11×30). Therefore, instead of calculating the outcome values by making multiple intensities and ranking them, the outcome value for each entity may instead be created simply by dividing each entity's total net emissions figure by its global normalizing metric. Therefore, in the example given, where the largest entity may have emissions of 100,000 metric tons of $CO_2e$, the middle-sized company emissions of 30,000 metric tons $CO_2e$, and the smallest company, 10,000 metric tons $CO_2e$. Outcome Values can simply be calculated as 100,000/10,000=10 for the largest; 30,000/3650=8.22 for the mid-sized; and 10,000/1190=8.40 for the smallest. Since this method is still essentially performing the same process, of calculating a final intensity value using a plurality of weighted metrics, it lies within the scope of the current invention.

Whichever exact method used to calculate them, the Outcome Values—formed from the weighted average ranking across the different carbon intensity metric columns—give the final rankings between the companies within the sector, in numerical form.

It is then necessary to convert these numerical rankings into a final ordered ranking in order to award simplified indicia, preferably a green star indicia. Preferably, zero to three stars or zero to five stars would be awarded to entities within a sector, but it is well understood that any number of indicia could be used.

Figure 19:
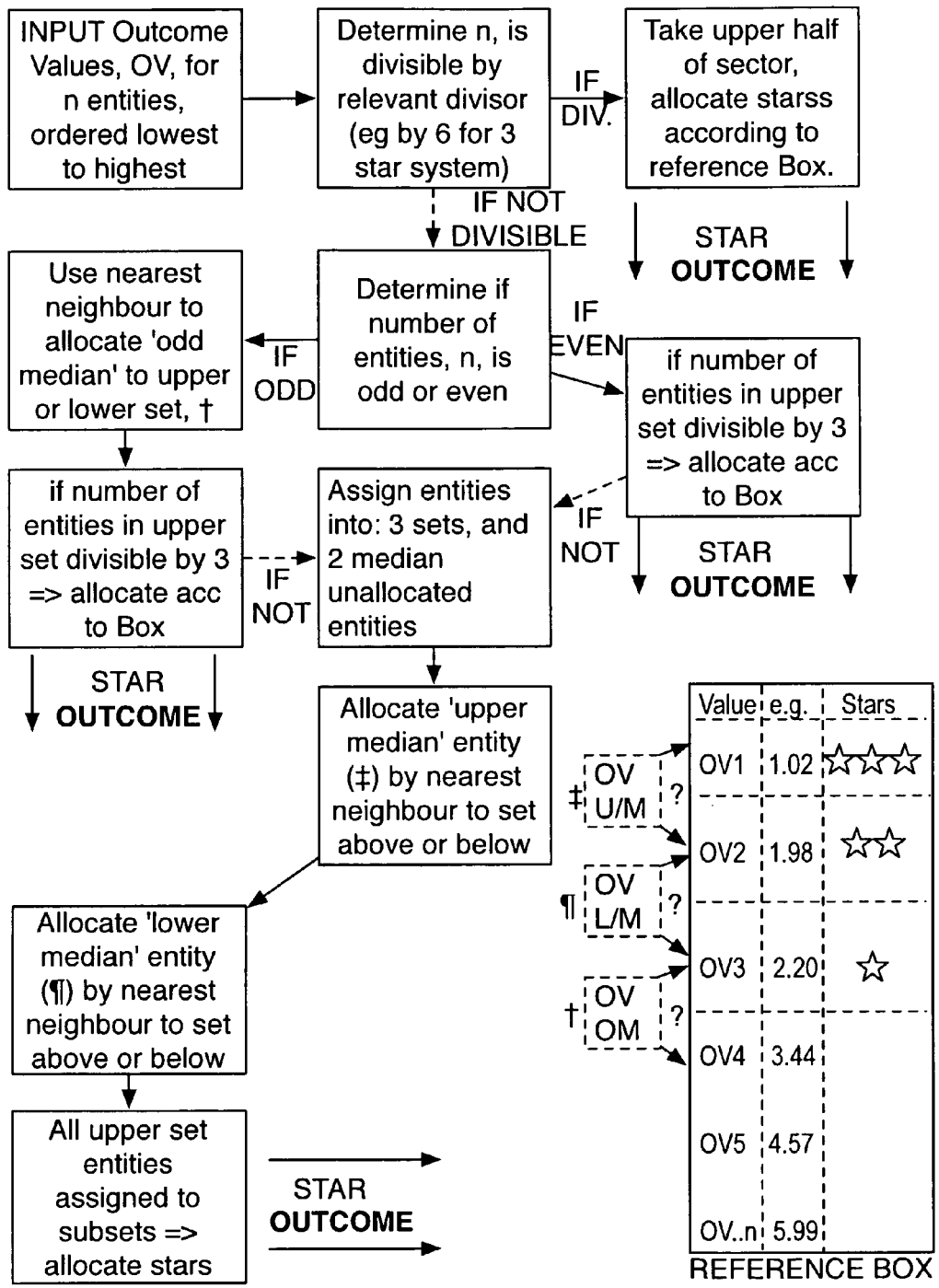
FIG. 19 shows the process by which a numerical Greenstar rating is transformed into a rating expressed in a number of ratings indicia.

Module 8 from FIG. 9 is responsible for assigning the rankings indicia to the entities ordered according to the Outcome Values input from Module 7. FIG. 19 shows detail of one possible process for transforming a ranked list of entities into a list of entities having a number of indicia awards assigned to members of the sector. Although any algorithm could be used to assign indicia to ranked entities, in the preferred embodiment of the invention, it is desirable that the lower half of ranked entities within a sector receive no stars, while the upper half be awarded 1, 2 or 3 stars according to their respective rankings. Optionally, there may be 1, 2, 3, 4, or 5 stars awarded, covering the whole spread of the sector, or any other desired combination. Within crowded sectors, more than one entity may receive the same number of stars. For fairness, the dividing lines between awards of any number of indicia must be well defined and applied consistently, regardless of the algorithm used to assign the indicia. All methods of assigning the indicia to a ranked list of entities is considered to be within the scope of the invention.

Figure 20:
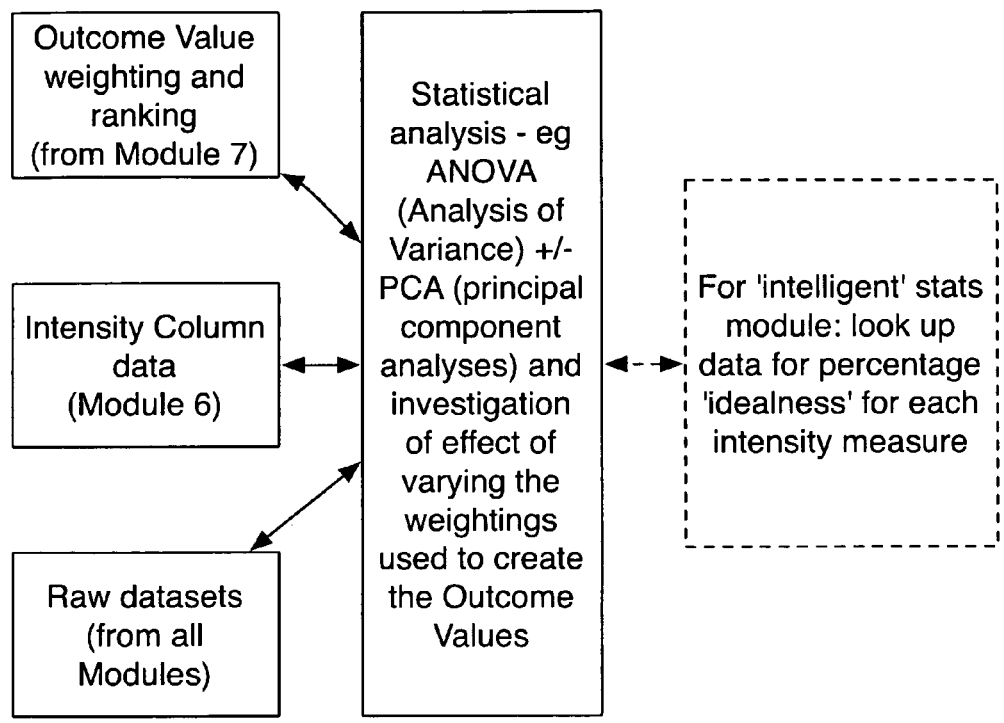
FIG. 20 shows details of a system module for performing statistical analyses on the results of the calculations involved in the Greenstar rating.

Module 9 in FIG. 9 performs a statistical analysis of the results of the calculation of the rankings between companies in the sector to gain a confidence in the statistical validity of the results. A simplified version of this is shown in FIG. 20, in which the intensities and weightings used in Modules 6 and 7, as well as, optionally, source data including the net emissions figures from Module 5 and the net offset figure from Module 4, as well as the raw datasets used in these calculations are input to a variance analysis. A detailed description of statistical analysis methodology, well known in the art, is beyond the scope of this filing. As such, it can be said that the statistical analysis is in place, regardless of the methodology used, to make sure that the normalizing steps are not biased toward one particular entity in the sector. It is envisaged that the statistics module could interrogate any of the previous data, sector data, or individual company data as appropriate, in addition to any datasets of supplied sector rules information necessary to execute the ratings. A sense of confidence in the validity of the results can be obtained by varying the weighting of the various intensity metrics upwards and downwards relative to one another and observing to what degree the resulting changes are reflected in the final outcome value rankings.

If the changes are very small then a very high confidence in the validity of the data may be obtained. However, if larger variations result, then the confidence in the results of the analysis may decline. As a result, further analysis can be done with respect to the intensity metrics for the sector, or the sector could be advertised as having a low validity. In one embodiment of the invention, a confidence level for each sector could be shown that will provide an indication for those that are looking at the results of whether the sector is valid or not.

In an alternative embodiment, the statistical analysis in Module 9 may be an intelligent module, with the ability to set or alter the weightings or the intensity metrics, rather than being a passive commentator on the validity of the outcome values. This would be achieved by using the statistical analysis module to decide upon the best-fit weightings to be used for each sector, rather than having the weightings for each intensity be set by human judgment. This would result in a more fluid system whereby the weightings are applied retrospectively, toward the end of ratings process, and would depend to some extent upon the outcome of the previous modules. One system for executing this retrospective weightings method, shown in FIG. 20, is to have certain tolerances decided upon for each intensity, which Statistics Module 9 can consult, indicating how 'ideal' intensity each is, compared to what it could be, based on practical considerations relating to the sector, the businesses within it, and the intensity measure itself. In this sense, the definition of 'ideal' is based on analysis of that intensity measure in isolation, and considering how ideal it is in a given sector example in relation to what it could be.

For instance, Per-Sales intensity for fashion retailers may be deemed to be only 25% ideal, since there may be large variations in price between fashion brands for clothing items despite their carrying similar carbon footprints (i.e., there is 'cash-carbon decoupling'), which may bias results. On the other hand, for another type of retailer, for example, groceries, where market forces keep prices relatively similar for goods with a similar carbon footprint (i.e., there is little 'cash-carbon decoupling'), Per-Sales intensity may be much better, say 90% of ideal.

Note that these percentage 'idealness' figures are not the same as the a priori weightings described previously, since the a priori weightings would have to add up to 100% across the sector. For example, in the method previously described, if there were three intensities being used, Per-Sales, Per-employee, and Per-square footage say, they may be allocated as 75%, 15% and 10% respectively, adding up to 100%. However, with the latter system described herein for intelligent retrospective weightings allocation, the intensities may be deemed to have, say 90%, 40% and 50% 'idealness' respectively, totaling 180%. In fact, it is conceivable in some circumstances that each intensity could be considered to be 100% ideal, totaling 300%. The calculation to determine the intelligent retrospective weightings may be any calculation that correlates the relationship between 1) The numeric percentage reliability of each intensity measure, measured as the amount of variance needed to be made to the weightings of any particular intensity column to affect the final ranking of Outcome Values, as previously described, and 2) The percentage 'idealness' of each intensity based on practical merits. For example, for a given sector, the statistics module might determine that Per-Sales intensity is a more 'reliable' intensity than Per-employees on numeric statistical criteria. It can then use this information to affect the percentage 'idealness' value it has for Per-Sales, and adjust upwards the weighting applied to Per-Sales. For example, if the preset percentage idealness for sales was 90%, the intelligent stats module could upwardly modulate the percentage idealness of Per-Sales accordingly—say to 95% idealness, while another less numerically reliable intensity metric, say Per-employee, may drop proportionally.

Once the intelligent statistics module has made all the necessary comparisons and adjustments, it may then convert the resulting percentage idealness scores to weightings adding up to 100%. For instance, if the adjusted idealness scores were 93% overall for Per-Sales, 33% for Per-Employee and 42% for Per-square footage, totaling 168%, they could be adjusted proportionally to the necessary 100% total by calculating each as: final weighting (% idealness)×(100/total % idealness), for example, (93)×(100/168) per the example above. Therefore in this example the final weightings to be applied would be Per-Sales 55.4%, Per-Employee 19.6%, Per-Square footage 25%.

There may also be statistical analysis performed on certain of those ratios of company data that do not directly relate to the emissions figures. These ratios may be termed "supplementary ratios" and may include, for example, ratios of the normalizing data against one another, for example calculating Sales/Employee or Sales/Sq footage ratios for each entity. The supplementary ratios may vary because of drastically different business models being used within the same sector. For example, different contractual models where one company may use far fewer actual full-time employees to achieve the same sales figure. These supplementary ratios are of use to ratings for Greenstar purposes in determining to what degree the companies in a given sector are comparable in terms of non-emission-related metrics. Statistical analysis performed using such measures can indicate to what extent the variance observed when varying the relative intensity weightings is due to the weightings themselves and their relation to emissions, versus what variance is due to inherent differences in the intra-company data.

In a sense, the supplementary ratios provide a degree of numeric comparability of companies within a sector in addition to the practical considerations which sectorized them in the first place, by the smart form in Module 1. Therefore, as well as being used to inform the statistical analysis, such supplementary ratio information may optionally be used to affect the sectorization in Module 1. For example, the observance of greater than a certain 'cut-off' degree of percentage difference in such ratios between two different entities may preclude them from both falling into the same sector for analysis—despite the practical similarities between the companies leading to their being sectorized together by the smart form method of Module 1.

In addition to usage in the statistical and sectorization modules, the supplementary ratios may also be used to create fractional 'adjustment factors'. These may be multiplied by the intensity figures, prior to ranking, to prevent bias which may arise as a result of observed differences in business practices.

Furthermore, other adjustment factors may be applied based on purely practical observed differences between companies, especially when those differences relate to the normalizing intensities used, and those differences can have numeric values for instance when demonstrated by market research. An example would be the finding, by market analysis, that one retailer was charging on average 10% more for a 'similar basket of items' to one of its sector peers. If it were the case that, price notwithstanding, such a basket of items carried the same carbon footprint, the retailer charging a lower price would be unfairly biased against by a ratings system using carbon emissions/Sales as an intensity metric in analysis, since the higher price charged by its competitor would simply mean that its resulting intensity figure was 10% lower, and thus it would place higher in the Per-Sales ordered rankings. Thus, where there is sufficiently strong practical evidence to support an adjustment ratio, such a ratio may be multiplied by the intensity measures prior to ranking. In this example, the retailer with 10% higher priced goods may have its Per-Sales intensity multiplied by 1.1 to take account of the bias.

In addition to the option to adjust intensity metrics by adjustment factors, there is also the option, covered within the scope of the invention, to break intensity measures into their constituent parts for the purposes of analysis. Therefore, for example with emissions Per-Unit Output, instead of considering metric tons of $CO_2$/Automobile, the intensity measures could be subdivided into metric tons of $CO_2$/Kg curb weight of vehicle and/or metric tons/seat-carrying capacity. These measures may then be analyzed together or separately to aid comparability, for example, between one manufacturer who makes only two-seater cars, with its competitors who make some with four and some with two seats.

Figure 21:
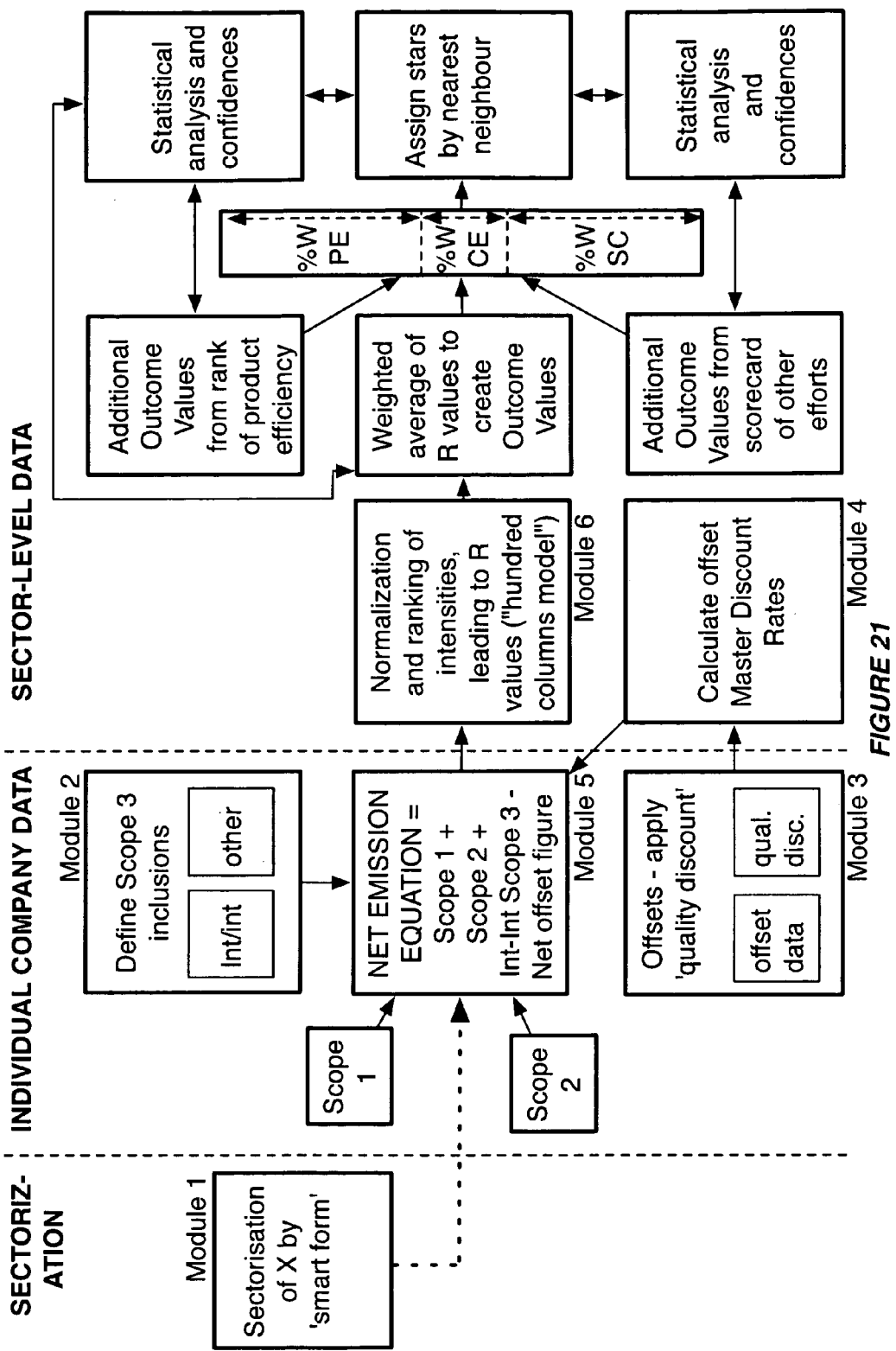
FIG. 21 shows an alternate embodiment of the invention in which the ratings of companies are calculated and evaluated in reference to their sector, similar to the embodiment shown in FIG. 9 but incorporating an extra step.

FIG. 21 shows an alternate embodiment of the whole modular algorithm—identical in process to FIG. 9 except for the addition of extra modules to create a final weighted average ranking step, applied in addition to those performed in Modules 6 and 7 for the company's own/supplier's emissions. The marginally more complex algorithm depicted in FIG. 21 is envisaged to be the one used for rating those sectors with complex emissions profiles—for whom ratings based on the company's own emissions alone may provide an incomplete picture—and for those sectors whose emissions accounting/reporting is not sufficient to use numeric data alone but demands also a scorecard approach, using scores arrived at by manual analysis to generate some of the numeric data for ratings. There are several sectors which may fall into such categories and certain of these are detailed below.

For some sectors whose member companies produce goods which themselves carry a carbon footprint during their customer use phase—that is, for example, vehicles burning fossil fuels, or electrical goods (provided that, as is most commonly the case at the time of filing, that the electricity used is not from fully clean renewable sources)—the company's own emissions are often a small part of the total emissions incurred as a result of the product. Companies manufacturing such carbon-intense goods may be considered to carry some responsibility for the emissions resulting from the lifetime use of their products, and, as such, should ideally have these considerations factored into their Greenstar rating. The method of system Module 10 in FIG. 21 accounts for this by creating ranked columns of efficiency measures for the carbon-intensive products made by each entity in the sector, broken down by percentage of production. Module 10 uses product efficiency measures in a similar way to the emissions intensities used in Modules 6 and 7. These ranked columns may then be computed in a similar way, converted to Product Efficiency Outcome Values and weighted in a similar manner to the computations used in those modules. The Outcome Values relating to the company emissions itself would still be calculated in parallel, and can then be weighted alongside the Product Efficiency Outcome Values to produce the single final Outcome Value. This final Outcome Value would then be used for star assignment in the normal way, as before.

The overall weighting applied to the rank values for product efficiency measures, as opposed to Company Emissions Outcome Values, may be determined by an average comparison of the relative impact of the lifetime use of a given product versus the product's manufacture. For example, if a certain class of vehicle, sold by a certain auto sector, creates 90% of its greenhouse gas emissions on average during its use by the customer, versus only 10% in its manufacture and distribution to the customer, then the Product Efficiency Outcome Value part of the weighted average may take a 90% weighting, versus 10% for the Company Emission Outcome Value. These weightings are indicated in FIG. 21 as the weightings percentage for product efficiency, '$W_{PE}$', and weighting percentage for Company Emissions, '$W_{CE}$'.

Companies which choose to offset the use-phase emissions on behalf of their customers may benefit from this practice by way of adjustment factors applied in a similar way to those applied to the emissions intensities as outlined above. In such a case, the adjustment factors may be calculated as a function of the offset total relative to the emissions created by an average year's emissions from driving a vehicle of the given efficiency for an average annual distance for the class of vehicle, known to those of skill in the art. In such a case the offsets may also be subject to a quality discount as shown in Module 3 of FIG. 9.

In addition to use of efficiency data of carbon intense products per se there is an option, included under the current invention, to apply more granular analysis to the product efficiency and consider the efficiency of their actual function. For instance when comparing the manufacturers of two vehicles, one with four seats and one with six, it may be desirable to consider also mile-per-gallon (and hence $CO_2$ emissions-per-mile) per seat carriage, rather than just per whole vehicle. This metric could then be considered alone or in combination with the efficiency per vehicle measure, with the purpose of making comparison fairer and more equitable. The proportion to which each derived granular efficiency metric is used may also be weighted as required, according to certain percentage weightings which may be calculated on a sector-by-sector or case-by-case basis.

A similar additional weighted average ranking step, to build a fuller picture of net emissions responsibility, may be applied to the ratings of energy and oil companies. For these companies there is need of a measure of parametric analysis in addition to the somewhat narrow view from analyzing their own carbon footprint in isolation, to reward shifts toward cleaner technologies and business models. For example, these measures could take the form of rankings of percentage investment in renewables in their R+D mix. Rank values calculated by comparing relative percentages may then be incorporated into the overall ratings in a similar way to product efficiency measures in Module 10.

Another aspect of the invention allows for the incorporation of a scorecard approach, wherein a numeric or percentage score is applied following analysis of any aspect of a company's "decarbonization" practice. The analysis for such a scorecard could be performed by the Greenstar company or a third party, and the scorecard could cover, but is not limited to, such aspects as: degree of carbon data public disclosure, employee engagement schemes, consumer education drives, efforts made to preferentially promote lower carbon technologies (e.g. phasing out tungsten lightbulbs) or actively carbon-positive technologies (such as solar panels), investment practices of a company's pension funds, and so on. Optionally, non-climate related environmental considerations such as recycling practices, renewable materials and water usage could be incorporated into a Greenstar rating. Scorecard measures, when applied within a sector, would lead to a supplementary ranking, to be incorporated in a similar manner to the ranked product efficiency measures, and are shown to enter the ratings process in Module 11 of FIG. 21, and also weighted relative to the other ratings elements. In the early years of implementation of the Greenstar system, the weighting, $W_{SC}$, applied to the scorecard component of the rating may be a relatively high percentage, to account for the fact that the accurate emissions data for the rigorous numerical emissions data part of the algorithm (i.e., Modules 3-7) of sufficient quality may not yet be widely available, while the scorecard judgments may be easier to make using publicly available data. For instance, if the scorecard applies a certain score, such as a points score out of a maximum 10 for a certain factor such as rating levels of transparency of public disclosure of emissions measurement systems, or scoring the policy stance of a rated company, the information is relatively easy to find in the public domain. In contrast, numerical emissions data is treated by some companies as confidential data and may be hard to attain, or may simply not be being measured yet in some sectors. As such, for some sectors, the initial weightings may optionally even be 100% for the scorecard system in the early years of the program, meaning that scorecard points make up the only source of data leading to a rating.

For that part of the rating coming from a scorecard system, company performance issues giving rise to the scorecard figure would likely include, but are not limited to, the following:

Completion of a greenhouse gas inventory at all
Inclusions within the inventory—i.e., how comprehensive, scope 3 inclusions etc
Standards used to form the inventory (e.g. WRI greenhouse gas protocol)
Accounting practices used in adhering to the standards
Transparency of the process and effectiveness of information distribution
Use of a third-party verifier for carbon-footprinting
Level to which the company includes other Kyoto gases other than just carbon
Assessments of management plan and seniority of emissions reduction team
Rigor of targets set, and success in achieving targets historically
Creation and innovation in low-carbon products and services
Level of supply chain involvement and stipulations enforced
Level of initiatives promoting employee engagement
Level of initiatives promoting customer engagement
Policy stance, and to what degree the company lobbies for low-emission policies
Rate of improvement over time
Proactivity in taking positive change, and leadership of own sector Each of the areas may be assigned a maximum and minimum possible score, for instance 1-10, and the company's actual performance assessed against these by analysts. The scores may be weighted according to their relative importance to the sector. Ultimately, the scorecard may vary on a sector-by-sector basis.

The other system modules in FIG. 21 (including the statistics module, though it is shown in two boxes in FIG. 21) would operate in a similar way to that described above for FIG. 9.

It should be understood by one of skill in the art that the system described, while explained in the context of a green rating system, could be used with a rating system based on any metrics. An example would be a "socially conscious" rating that would award companies for other intangibles, such as not utilizing child labor in foreign manufacturing facilities, or guaranteeing to reward indigenous peoples fairly and adequately for products or raw materials offered to market, etc. Once the set of metrics is defined, the invention should work identical to the one described herein for green ratings. Additionally, the invention includes the option to have a number of ratings indicia displayed together, such as the Greenstar rating, the product-specific rating previously described, and the socially conscious rating, also previously described. As a result, the invention is not meant to be limited to specific embodiments described herein, but is defined by the scope of the claims which follow.

In addition, it is well understood by those of skill in the art, that a system could be implemented which assigns functionality to differently arranged modules, which achieving the same result. Implementations which modularize the process differently are therefore considered equivalents of the disclosed implementation.

I claim:

1. A method undertaken on a computer, network or online software package, for ranking an entity against a group of other, like entities, on its environmental and/or social performance, comprising the steps of:
  a. collecting data regarding the environmental and/or social footprint of said entities and/or their product ranges, said data to include company-level pollutant and/or greenhouse gas emissions data;
  b. collecting additional normalizing data regarding the size and/or activity of the said entities and/or their product ranges;
  c. performing normalization calculations using said collected data in order to create derived normalized metrics relating to said entities, by way of using normalizing ratio-type calculations serving to divide data on social and/or ethical impacts by data on size and/or activity;
  d. performing said calculations on metrics covering at least both the entities' past reductions performance, and current efficiency performance, the latter using the most recent time series data;
  e. ranking said entities on each metric studied, by reference to comparing said derived normalized metrics of said entities versus similar normalized metrics for the others in the group of comparable entities;
  f. weighting said resultant ranking metrics at a certain level according to the relevance and relative impacts of each of said metrics to the specific industry grouping to which said entities belong, and/or analyzing them in distinct interim analysis modules;
  g. calculating a total overall ranking by crossing the values from the one or more different entities and/or interim analysis modules in a data matrix and/or by performing an overall weighted average between modules, the input data being the ranking for each of said entities for said module;
  h. assigning simplified numerical and/or graphical and/or textual indicia to represent the overall ranking of one or more of the said ranked entities;
  i. using the simplified indicia in marketing or other publicity-related activities for the entities in online contexts including search engines and social networks, and/or offline contexts.

2. The method of claim 1 wherein said one or more factors are related to the greenhouse gas emissions of each of said entities.

3. The method of claim 2 wherein said one or more factors include Scope 1, Scope 2 and/or Scope 3 greenhouse gas emissions.

4. The method of claim 2 further comprising the step of calculating a gross greenhouse gas emissions figure for each of said entities.

5. The method of claim 4 further comprising the step of subtracting the emissions reduction credits of purchased offsets from said gross greenhouse gas emissions figure to obtain a net emissions figure for each of said entities.

6. The method of claim 5 in which said net emissions figure is modified based on differences in the business model of each of said rated entities with said sector.

7. The method of claim 5 wherein the value of purchased offsets is discounted based on the perceived quality of said purchased offsets.

8. The method of claim 5 wherein the value of purchased offsets is discounted by a master discount rate.

9. The method of claim 8 wherein said master discount rate is the same for all entities with said group.

10. The method of claim 9 wherein said master discount rate is different for each entity within said group.

11. The method of claim 10 wherein said master discount rate is based on an improvement velocity metric calculated over a fixed period of time.

12. The method of claim 10 wherein said master discount rate is based on the actual greenhouse gas emissions of the entity, normalized against all other entities in the sector.

13. The method of claim 10 wherein said master discount rate is based on a ranking of said entities against comparable entities based on intensity metrics for greenhouse gas emissions.

14. The method of claim 5 wherein the value of purchased offsets is discounted by a rate based on the perceived quality of said purchased offsets and further discounted by a master discount rate.

15. The method of claim 5 wherein said ranking step includes the steps of:
  a. identifying one or more intensity metrics;
  b. normalizing said net greenhouse gas emissions figure for each of said entities for each of said intensity metrics or for a blended intensity metric; and
  c. for each of said intensity metrics, ranking each of said entities based on said normalized net greenhouse gas emissions figure.

16. The method of claim 15 wherein said intensity metrics are chosen based on said characteristics of said entities in the group of said entities being ranked.

17. The method of claim 16 wherein said intensity metrics are based on net greenhouse gas emissions per unit of output or business activity of said entities.

18. The method of claim 17 wherein said unit of output or business activity is adjusted to make said unit of output or business activity more comparable between different entities in the sector.

19. The method of claim 15 wherein said intensity metrics are selected from a group consisting of net greenhouse gas emissions per dollar value of sale, per dollar of value-add, per number of employees and per facility square footage.

20. The method of claim 19 wherein said intensity metrics based on dollar sales figures are adjusted by a differential pricing figure to make the entities more accurately comparable.

21. The method of claim 1 wherein said group of entities includes one or more virtual entities, representing entities having the highest possible ranking and the lowest possible ranking within said group.

22. The method of claim 15 wherein said weighting step further comprises the steps of:
  a. assigning a weighting factor for each of said intensity metrics;
  b. multiplying the ranking for each entity for each of said metrics by the weighting factor for that metric;
  c. summing the results for each entity over all of said metrics; and
  d. dividing the result for each entity by 100 to obtain an overall ranking for each entity with respect to all other entities in the group.

23. The method of claim 15 wherein said weighting step further comprises the steps of:
  a. assigning a percentage weighting factor to each of said intensity metrics;
  b. modulating said ranking of each of said entities for each of said intensity metrics by said percentage weighting factor; and
  c. obtaining an overall ranking of all entities within said group.

24. The method of claim 23 wherein said assigning step further comprises:
  a. excluding the lower half of said ranked entities; and
  b. assigning one or more indicia to each entity in the upper half of said ranked entities, based upon their relative positions.

25. The method of claim 3 wherein said Scope 3 emissions includes integral-intensive type emissions.

26. The method of claim 25 wherein said the types of integral-intensive emissions vary from group to group.

27. The method of claim 25 wherein said integral-intensive emissions include greenhouse gas emissions responsibility for services provided to an entity by a third party that other entities in the group may perform in-house.

28. The method claim 25 wherein said integral-intensive emissions are selected from a group consisting of emissions related to business travel, emissions related to the transportation of finished goods; emissions related to the storage and refrigeration of finished goods, emissions related to the provision of data center services and emissions related to waste disposal and management.

29. The method of claim 25 wherein said Scope 3 emissions further includes emissions responsibility for first degree upstream suppliers of finished goods, raw materials and services.

30. The method of claim 25 wherein said Scope 3 emissions further includes emissions responsibility related to the use of an entity's finished goods over the lifetime of said goods.

31. The method of claim 1 wherein said finished goods of each of said entities in said group are assessed for product efficiency and further wherein each of said entities in said group receive a relative ranking based upon said assessed product efficiency.

32. The method of claim 31 wherein said overall ranking is adjusted based on said product efficiency ranking, by assigning weighting factors to said overall ranking and said product efficiency ranking and recalculating said overall ranking.

33. The method of claim 32 wherein the effect of said product efficiency ranking on said overall ranking may be mitigated by purchasing offsets on behalf of the end users of said finished goods.

34. The method of claim 3 wherein said Scope 3 emissions includes integral-intensive type emissions, emissions responsibility for first degree upstream suppliers of finished goods, raw materials and services and emissions responsibility related to the use of an entity's finished goods over the lifetime of said goods.

35. The method of claim 22 further comprising the step of performing a statistical analysis on the calculated rankings to assess the degree of confidence in the results.

36. The method of claim 35 wherein said statistical analysis includes varying the weightings of said one or more factors and assessing the variance in the overall rankings results.

37. The method of claim 36 wherein said statistical analysis includes calculating one or more supplementary ratios to assess the validity of comparisons between entities in a sector.

38. The method of claim 37 wherein said statistical analysis using said supplementary ratios is used to move one or more of said entities to a different group or as input to the initial grouping of said entities.

39. The method of claim 37 wherein aid statistical analysis using said supplementary ratios may be used to adjust said weighting factors of said intensity metrics.

40. The method of claim 35 further comprising the step of performing a statistical analysis of the calculated rankings and utilizing the results of said statistical analysis to set or adjust said weighting factors for said intensity metrics.

41. The method of claim 40 wherein each of said intensity metrics has a set of tolerances associated therewith, said tolerances indicating the degree of applicability of said metric across all entities in said group.

42. The method of claim 22 wherein said weighting factors for each of said intensity metrics are adjusted based on differences in the measurement of said metric between entities in said group.

43. A method using a computer network for ranking an entity against a group of other, like entities based on the entities' greenhouse gas emissions, comprising the steps of:
   a. calculating a net greenhouse gas emissions figure for each of said entities within said group;
   b. applying normalizing calculations to generate intensity metrics to take account of the entities' size and/or activity;
   c. calculating a ranking for each entity in said group for one or more of said intensity metrics based on each entities' net greenhouse gas emissions figure;
   d. weighting each of said intensity metrics as a percentage of an overall ranking;
   e. calculating an overall ranking of, said entities based on the ranking for each of said entities for each of said intensity metrics and the weighting for each of said intensity metrics; and
   f. assigning indicia to one or more of said ranked entities, said indicia indicating the relative overall ranking of said entities.

44. The method of claim 43 wherein said net greenhouse gas emissions figure for each of said entities includes the gross greenhouse gas emissions minus the value of any offsets purchased by each entity.

45. The method of claim 44 wherein the value of purchased offsets may be discounted.

46. The method of claim 45 wherein said offsets may be discounted based on the perceived quality of the offsets and further by a master discount rate.

47. The method of claim 43 further comprising the step of grouping said entity with other, like entities, based on characteristics of said entities.

48. The method of claim 47 step of grouping includes the step of asking a series of questions, wherein subsequent questions in said series are based on the answers received in response to one or more earlier questions.

49. The method of claim 1 wherein said overall ranking can be maintained at a certain level in a subsequent ratings cycle if the entity hits certain reduction or efficiency performance criteria.

50. A software system for execution on a computer for ranking an entity against a group of other, like entities comprising:
   a. a data collection module programmable using standard extant database programming languages, for collecting data regarding each of said entities based on one or more factors and for calculating the net greenhouse gas emissions for each of said entities programmable using standard extant programming languages and incorporating the algorithms disclosed herein;
   b. a normalization and ranking module for ranking said entities within said group based on said collected data, normalizing characteristics of each of said entities and a weighting of said normalizing characteristics, programmable using standard extant programming languages and incorporating the algorithms disclosed herein; and
   c. an indicia module, for assigning indicia to one or more of said ranked entities, programmable using standard extant programming languages and incorporating the algorithms disclosed herein, said indicia indicating the relative overall ranking of said entities.

51. The system of claim 50 wherein said rankings are based on greenhouse gas emissions.

52. The system of claim 51 wherein said data collection module produces a net greenhouse gas emissions figure for each of said entities based on Scope 1 and Scope 2 greenhouse gas emissions and the value of any offsets purchased by said entity.

53. The system of claim 52 wherein said net greenhouse gas emissions figure also includes integral-intensive Scope 3 emissions.

54. The system of claim 53 wherein said net greenhouse gas emissions figure includes all Scope 3 emissions.

55. The system of claim 53 further comprising a Scope 3 collection and calculation module, for collecting calculating each entity's Scope 3 emissions.

56. The system of claim 52 further comprising an offset module for calculating the value of any offsets purchased by aid entity.

57. The system of claim 56 wherein said offset module discounts purchased offsets based on their perceived quality.

58. The system of claim 57 further comprising a master discount rate calculation module for calculating and applying a master discount rate to purchased offsets.

59. The system of claim 58 wherein said master discount rate is the same for all entities with said group.

60. The system of claim 58 wherein said master discount rate is different for each entity within said group.

61. The system of claim 60 wherein said master discount rate is based on an improvement velocity metric calculated over a fixed period of time.

62. The system of claim 60 wherein said master discount rate is based on the actual greenhouse gas emissions of the entity, normalized against all other entities in the sector.

63. The system of claim 51 wherein said normalization and ranking module ranks said entities based on a ratio of their net greenhouse gas emissions to one or more normalizing characteristics.

64. The system of claim 63 further comprising a weightings module for applying a weight to each of said normalizing characteristics and calculating a final ranking score for each entity based on said weighted normalization characteristics.

65. The system of claim 50 further comprising a sectorization module, for grouping said entity with other, like entities.

66. The system of claim 65 wherein said sectorization module generates a series of questions, wherein subsequent questions in said series are based on the answers received in response to one or more earlier questions.

67. The system of claim 50 further comprising a statistical analysis module to analyze the calculated rankings to assess the degree of confidence in the results.

68. The system of claim 67 wherein said statistical analysis includes varying the weightings of said one or more normalizing characteristics and assessing the variance in the overall rankings results.

69. The system of claim 67 wherein the results of said statistical analysis may be used to move entities to other groups.

70. The system of claim 67 wherein the results of said statistical analysis may be used alter the weightings of said one or more normalizing characteristics.

71. The system of claim 50 wherein said indicia module assigns indicia to the top half of ranked entities with said group, assigning one or more indicia to each entity in said top half based upon their relative positions.

72. A software system for execution on a computer for ranking an entity against a group of other, like entities based on greenhouse gas emissions, comprising:
   a. a data collection module programmable using standard extant database programming languages, for calculating net greenhouse gas emissions figure for each of said entities within said group;
   b. a normalization, ranking and weighting module for calculating an overall relative ranking for each entity in said group based on each entities' net greenhouse gas emission figure against one or more weighted intensity metrics and reductions performance, programmable using standard extant programming languages and incorporating the algorithms disclosed;
   c. an indicia module, for assigning indicia to one or more of said ranked entities, said indicia indicating the relative overall ranking of said entities with respect to each other, programmable using standard extant programming languages and incorporating the algorithms disclosed.

73. The system of claim 72 wherein said net greenhouse gas emissions figure for each of said entities includes the gross greenhouse gas emissions minus the discounted value of any offsets purchased by each entity.

74. A method for utilizing a ratings system of environmental, social or ethical performance for marketing purposes, deployed on a computer, network or online system and comprising the steps of:
   a. generating a rating for a plurality of entities in a related group based on their performance against each other on criteria relating to their relative environmental, social or ethical performance;
   b. assigning an indicia representing said rating to each of said plurality of entities; and
   c. allowing the use and display of the ratings indicia in an online context on search engines, browser display and social media.

75. The method of claim 74 wherein said rating of entities is based on a scorecard approach wherein said entities are subjectively rated based on said one or more criteria by one or more subject matter experts.

76. The method of claim 74 further comprising the step of establishing metrics for calculating ratings within said ratings system and further wherein said step of rating a plurality of entities includes the step of rating each of said entity's performance as measured by said established metrics.

77. The method of claim 76 wherein said online context is an internet search engine, further comprising the step of allowing said internet search engine to display said assigned indicia when one or more of said entities having indicia assigned thereto appears on a search results list or in a sponsored links list, said indicia appearing in close proximity to the name of or a link to said related entity.

78. The method of claim 75 further comprising the step of filtering said search results list or said sponsored list such that entities having higher rankings appear nearer the top of said list and entities having lower rankings or no rankings appear nearer the bottom of said list.

79. The method of claim 78 wherein said entities may bid against other members of said group for placement of their name or logo and ratings indicia.

80. The method of claim 79 wherein entities submitting a bid below a pre-determined minimum will not be able to display said indicia.

81. The method of claim 74 wherein said online context consists of display on a mobile handset as the result of the receipt of a text message, a multi media message, an email message, an instant message or via any form of social networking service.

82. The method of claim 77 wherein said search results list is the result of a vertical search in which only rated entities appear as the results of said search.

83. The method of claim 77 wherein said search results list is the result of a blended search.

84. The method of claim 77 wherein said search results list is dependent upon the specific interests of the user performing said search.

* * * * *